(12) United States Patent
Miller et al.

(10) Patent No.: US 7,803,296 B2
(45) Date of Patent: Sep. 28, 2010

(54) METHODS AND SYSTEMS FOR PREPARING GYPSUM SLURRY CONTAINING A CELLULOSE ETHER

(75) Inventors: David Paul Miller, Lindenhurst, IL (US); Qingxia Liu, Vernon Hills, IL (US); Qiang Yu, Grayslake, IL (US)

(73) Assignee: United States Gypsum Company, Chicago, IL (US)

(*) Notice: Subject to any disclaimer, the term of this patent is extended or adjusted under 35 U.S.C. 154(b) by 319 days.

(21) Appl. No.: 11/811,479

(22) Filed: Jun. 11, 2007

(65) Prior Publication Data
US 2008/0303191 A1    Dec. 11, 2008

(51) Int. Cl.
| B28B 1/26 | (2006.01) |
| B27N 3/00 | (2006.01) |
| A61K 9/127 | (2006.01) |
| B01J 13/02 | (2006.01) |
| B01J 13/04 | (2006.01) |
| C04B 16/08 | (2006.01) |
| C04B 20/00 | (2006.01) |
| C04B 38/00 | (2006.01) |
| C04B 9/04 | (2006.01) |
| C04B 11/00 | (2006.01) |
| C04B 28/14 | (2006.01) |

(52) U.S. Cl. .................. 264/86; 264/109; 264/4.1; 106/677; 106/678; 106/778

(58) Field of Classification Search ............ 264/86, 264/109, 4.1; 106/677–678, 778
See application file for complete search history.

(56) References Cited

U.S. PATENT DOCUMENTS

| 2,078,199 A | 4/1937 | King |
| 3,573,947 A | 4/1971 | Kinkade et al. |
| 3,900,546 A | 8/1975 | Kaukeinen |
| 4,236,849 A | 12/1980 | Kennedy-Skipton |
| 4,312,908 A | 1/1982 | Jasperson |
| 4,353,748 A | 10/1982 | Birchall et al. |
| 4,380,960 A * | 4/1983 | Dickinson ............... 110/347 |
| 4,853,050 A | 8/1989 | Bates et al. |
| 5,151,731 A | 9/1992 | Yamada et al. |
| 5,360,579 A | 11/1994 | Duquenne |
| 5,393,436 A | 2/1995 | Nagan |
| 5,521,235 A | 5/1996 | Redelius |
| 5,573,333 A * | 11/1996 | Dahlman ............... 366/132 |

(Continued)

FOREIGN PATENT DOCUMENTS

JP          07292344 A  * 11/1995

OTHER PUBLICATIONS

Nozzle definition, 1683, Merriam Webster Online Dictionary, http://www.merriam-webster.com/dictionary/nozzle.*

*Primary Examiner*—Khanh Nguyen
*Assistant Examiner*—Matthew Hoover
(74) *Attorney, Agent, or Firm*—Greer, Burns & Crain, Ltd.; David F. Janci, Esq.; Pradip Sahu, Esq.

(57) ABSTRACT

A method for forming a gypsum slurry comprises the steps of combining gypsum and water to form a slurry, combining cellulose ether with at least a second material configured to delay solubilization of the cellulose ether, and adding the combined cellulose ether and at least a second material to the slurry.

22 Claims, 13 Drawing Sheets

U.S. PATENT DOCUMENTS

| | | |
|---|---|---|
| 5,584,895 A | 12/1996 | Seike et al. |
| 5,641,847 A | 6/1997 | Hozumi et al. |
| 5,683,635 A | 11/1997 | Sucech et al. |
| 5,733,352 A | 3/1998 | Ogawa et al. |
| 5,762,841 A | 6/1998 | Shimai et al. |
| 5,817,728 A | 10/1998 | Higuchi et al. |
| 5,912,116 A | 6/1999 | Caldwell |
| 5,976,235 A | 11/1999 | Andersen et al. |
| 6,165,261 A * | 12/2000 | Wantling .................... 106/778 |
| 6,171,388 B1 * | 1/2001 | Jobbins ...................... 106/778 |
| 6,180,037 B1 | 1/2001 | Andersen et al. |
| 6,197,235 B1 | 3/2001 | Miller et al. |
| 6,409,824 B1 | 6/2002 | Veeramasuneni et al. |
| 6,409,825 B1 | 6/2002 | Yu et al. |
| 6,481,171 B2 | 11/2002 | Yu et al. |
| 6,605,186 B2 | 8/2003 | Miller |
| 6,723,247 B2 | 4/2004 | Martin |
| 6,743,830 B2 | 6/2004 | Soane et al. |
| 6,773,639 B2 | 8/2004 | Moyes et al. |
| 6,841,232 B2 | 1/2005 | Tagge et al. |
| 6,875,359 B2 | 4/2005 | Ogawa et al. |
| 6,893,751 B2 | 5/2005 | Naji et al. |
| 6,902,797 B2 * | 6/2005 | Pollock et al. ........... 428/304.4 |
| 2003/0092784 A1 | 5/2003 | Tagge et al. |
| 2004/0092625 A1 * | 5/2004 | Pollock et al. ................ 524/42 |
| 2004/0121114 A1 | 6/2004 | Piana et al. |
| 2004/0137194 A1 | 7/2004 | Fukao et al. |
| 2004/0187685 A1 * | 9/2004 | Tatsuhara et al. ............. 95/148 |
| 2005/0126437 A1 * | 6/2005 | Tagge et al. ............ 106/217.01 |
| 2005/0161853 A1 * | 7/2005 | Miller et al. ................ 264/109 |
| 2005/0188649 A1 | 9/2005 | Hagen, Jr. |
| 2005/0221705 A1 | 10/2005 | Hitch |
| 2006/0037515 A1 | 2/2006 | Tagge et al. |
| 2006/0202051 A1 | 9/2006 | Parsons et al. |

* cited by examiner

METHODS AND SYSTEMS FOR PREPARING GYPSUM SLURRY CONTAINING A CELLULOSE ETHER

FIELD OF THE INVENTION

A field of the invention is methods and systems for making gypsum board products. Additional fields of the invention are methods and systems for preparing a gypsum slurry containing a cellulose ether.

BACKGROUND

This invention relates to improved gypsum products and methods for making them. Example embodiments include methods and systems for addition of cellulose ether to a gypsum slurry that are useful to make gypsum board products such as gypsum wallboard, gypsum fiberboard, and the like (use of the term "gypsum board" herein is intended to include at least gypsum board panel, gypsum fiberboard, and gypsum wallboard products).

Gypsum board products are commonly used as building materials, with an example being wallboard and fiberboard sheets, for many reasons. They are easily manipulated to make continuous walls of desired shapes and sizes. They are durable, easily installed, patched and have beneficial insulation, fire and sound proofing properties. Decorative finishes, such as wallpaper or paint readily adhere to surfaces to allow for a large variety of decorating options.

Gypsum wallboard products are made using gypsum slurries. Water is added to calcined gypsum, also known as calcium sulfate hemihydrate, to form a pumpable and flowable slurry. The slurry is continuously deposited on a moving sheet of wallboard facing material or paperboard running at high speed, and a second sheet is then deposited over the slurry. As the slurry sets between the two sheets it converts back to its dihydrate form by absorbing and chemically reacting with water and hardens. A foam may also be added to the slurry to introduce gaseous bubbles or voids which are ultimately captured within the crystalline gypsum dihydrate. These can be beneficial to reduce the density of the gypsum board products without a significant reduction in strength.

Gypsum fiberboard sheets can be made by combining gypsum in its dihydrate form with cellulosic fibers such as wood or paper pulp. Water is added to form a slurry. The slurry is heated, typically under pressure, to calcine the gypsum and convert it to its hemihydrate form. Hemihydrate crystals form around and on the cellulosic fibers. The slurry is then deposited under atmospheric conditions on a forming wire. As water is removed on the forming wire and the slurry cools, the gypsum hemihydrate converts back to its dihydrate state and forms an interlocking solid matrix of crystals around the cellulosic fibers. In the cases of both gypsum wallboard and fiberboard, the manufacturing is typically carried out in high speed, continuous processes. Physical properties of the slurry in both cases are relatively tightly controlled in order to achieve satisfactory performance requirement of this process and the final board product.

Proposals have been made to increase the strength of gypsum board products or otherwise modify their properties. Some proposals include providing one or more additives to the gypsum slurry to affect the characteristics of the resulting dried board product. Some proposed additives, however, may affect the viscosity, tackiness or other properties of the slurry. Taking slurry viscosity as an example, excessive viscosity can lead to increased mixing time, increased energy demands, and resultant increased costs. Worse still, if viscosity increases become excessive, an incompletely mixed slurry or improperly formed board can result.

Also, addition of additives to the gypsum slurry can result in compatibility problems with other slurry components. Some additives, for example, have a surface active or surfactant functionality. These additives have the potential of destabilizing or otherwise interfering with a slurry foam additive. Some additives also have the potential of inadequate dispersion within the slurry. In the case of a viscous liquid or gel additive, for example, there is a risk that the high viscosity and limited residence time in the slurry mixer will cause an inadequate mixing.

Accordingly, problems exist in the art related to effective addition of additives to gypsum slurries.

SUMMARY OF THE INVENTION

The present invention addresses the above outlined and other problems in the art. Some embodiments of the invention are directed to methods and systems for preparing gypsum slurry useful for making a gypsum board product. One example method comprises the steps of combining gypsum and water to form a slurry, combining cellulose ether with at least a second material configured to delay solubilization of the cellulose ether, and adding the combined cellulose ether and at least a second material to the slurry. The step of combining the cellulose ether with at least a second material may comprise, for example, combining the cellulose ether with water at a high temperature. In another example embodiment of the invention, the step of combining the cellulose ether with at least a second material comprises forming an emulsion with said cellulose ether as its dispersed phase. In still an additional embodiment of the invention, a cross linker is added to the slurry.

DETAILED DESCRIPTION OF THE INVENTION

Figure 1:
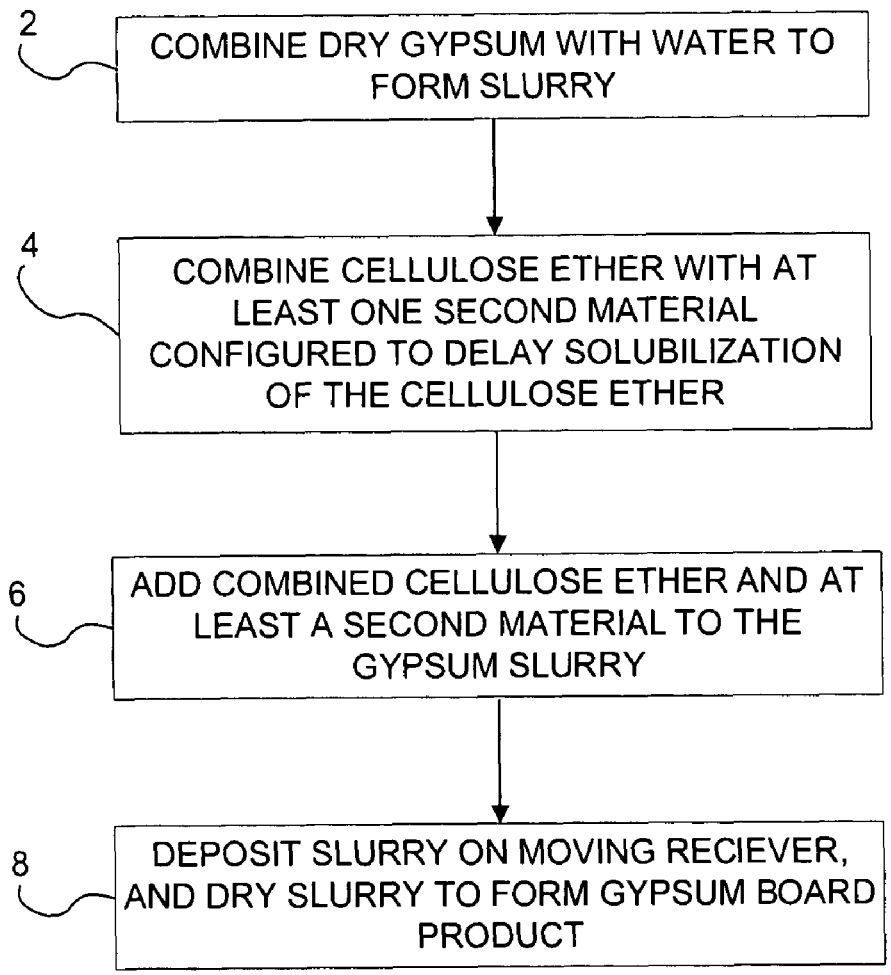
FIG. 1 is a flowchart of one method of the invention

Before discussing example embodiments of the invention in detail, it will be appreciated that the present invention may be practiced in the form of systems and as methods. It will further be appreciated that in describing a system of the invention herein, description of a method of the invention may be simultaneously made. For example, one knowledgeable in the art will appreciate that description of a system of the invention made below may likewise be considered to be description of a method of the invention that includes steps of using or operating the system being described.

Turning now to exemplary methods and systems of the invention, they have in common that they exploit benefits and advantages related to the use of cellulose ether in gypsum slurries. It has been discovered that cellulose ether can improve the performance of some gypsum products. Taking gypsum wallboard as an example, it is believed that addition of cellulose ether to the gypsum slurry used to form the wallboard can result in increased strength of the final wallboard product. It is believed that this increase in strength is at least partially a result of the cellulose ether increasing chemical and/or mechanical bonds within the wallboard, including of the interconnecting gypsum crystals.

For example, it is believed that the cellulose ether forms a flexible polymer webbing and/or an adhesive like film that are interspersed with the calcium sulfate dihydrate solid in the final board product. This is useful to distribute loads bearing on the board product. The polymer webbing and/or film may be useful to strengthen gypsum-to-gypsum bonding and gypsum-to-wallboard facing-sheet bonding. This and other effects of cellulose ether additives lead to increased flexural strength of the board product without significant increase in board thickness or appreciable change in density.

Any of several cellulose ethers are believed to be useful in practice of systems and methods of the invention. Accordingly, it will be appreciated that as used herein the term "cellulose ether" is intended to be broadly interpreted and to include a wide variety of particular compounds that may be characterized as a cellulose ether. Cellulose ethers include a large number of cellulose derivatives, and may be obtained by reacting cellulose with an alcohol. Cellulose is the chief constituent of the walls of plants. Chemically, it is a carbohydrate that is a high molecular weight polysaccharide. An ether is any of a number of organic compounds whose molecules contain two hydrocarbon groups joined by single bonds to an oxygen atom.

Cellulose ethers are long-chain polymers. Their solution characteristics depend on the average chain length or degree of polymerization (DP) as well as the degree of substitution (DS) and other properties. Average chain length and degree of substitution determine molecular weight of the polymer. As molecular weight increases, the viscosity of cellulose ether solutions increases rapidly. Some commercially available cellulose ethers have MW's that vary from about 90,000 (DP=400) to 700,000 (DP=3,200).

Particular examples of cellulose ethers believed to be useful with methods and systems of the invention include, but are not limited to, ethyl celluloses, propyl celluloses such as hydroxypropyl cellulose, and methyl celluloses with widely available commercial examples including CULMINAL MC 7000, methyl cellulose and CULMINAL MHPC 1034 methyl hydroxypropyl cellulose from Hercules Aqualon Division, Wilmington, Del. Others include cellulose ether products from DOW CHEMICAL, Midland, Mich., including methyl celluloses such as A4C, A15, A40 and others, DOW's hydroxypropyl methylcellulose products, and similar products available from other vendors as will be known to those skilled in the art.

Due to the effects of branching, chain length, etc., the viscosity of methyl celluloses are typically described based on the Brookfield viscosity of a 2% solution at 68° F. (20° C.) using a RV viscometer at 20 rpm. For the CULMINAL HPMC, typical viscosity is about 30,000 with a dry particle size of 8% max on a No. 120 (0.125 mm) screen. A range is between about 20-50,000 cps. For the CULMINAL MC, a range is between about 10-15,000 cps. In many applications, ranges between about 5,000-50,000 and between about 1,500-15,000 for the HPMC and MC, respectively, are believed to be useful. Other suitable ranges are 10,000-50,000 and 3,000 to 15,000 for the HPMC and MC, respectively. Other ranges will also be useful in invention embodiments.

When dissolved in cold water, cellulose ethers initially dissolve and then hydrate to form a viscous solution or gel. Viscosity generally varies with MW—longer chain (higher MW) cellulose ethers result in higher viscosity gels or solutions. Cellulose ether is not soluble in hot water. The temperature at which cellulose ether begins to dissolve in water depends at least to some extent on chain length (MW). For many cellulose ethers in water, solubility changes at temperatures of about 150°-160° F. (about 66°-71° C.) (and above about 180° F. (about 82° C.) for hydroxyl propyl cellulose ether). Cellulose ether is generally not soluble in aqueous solutions above this temperature and generally is soluble below it. In hot water (e.g., above about 150° F. (66° C.) to about 180° F. (82° C.)) it is a suspension, in cooler water (e.g., below about 150° F. (66° C.)) before it thickens, it is a solution. Once it hydrates, it forms a gel.

First Example Method and System

Having now discussed some physical properties and characteristics of some cellulose ethers that may be useful in practice of some invention embodiments, further detail regarding methods and systems of the invention that exploit these properties to result in improved gypsum board products can be discussed. Several example methods and systems will be discussed. Although some aspects of these methods and systems differ from one another in one way or another, they share some steps and structural elements which have been discovered to offer useful advantages and benefits. For example, many different embodiments of the invention include steps and elements useful to deliver a cellulose ether to a gypsum slurry, and/or to form a gypsum board product (such as wallboard or fiberboard) from a slurry that includes cellulose ether.

In order to best illustrate the invention, FIG. 1 is provided to illustrate general steps of one example method of the invention. Further detail regarding the general steps of FIG. 1 will be made herein below when describing additional particular embodiments of methods and systems of the invention that are directed to methods for making different particular gypsum slurries and board products.

In an initial step of the method of FIG. 1, dry gypsum is combined with water to form a gypsum slurry. Block 2. The slurry may be formed, for example, using either dry calcined gypsum (in the case of a method for making a gypsum wallboard slurry) or gypsum in its dihydrate form (in the case of a method for making gypsum fiberboard slurry). The step of Block 2 may further include combining other materials with the gypsum and water, with an example including a cellulosic fiber in the case of a method for making a slurry for a gypsum fiberboard product. As will be described in greater detail below, one example of the step of Block 2 may be carried out in a mixer during a continuous process of making a gypsum board product.

Many different cellulose ethers will be suitable for use in different methods and systems of the invention, with examples including but not limited to ethyl cellulose, propyl cellulose, hydroxypropyl cellulose, and methyl cellulose. The amount of cellulose ether provided will vary depending on the type used and other application specific parameters. In many applications a weight ratio of between about 0.3 to 2 parts cellulose ether per about 99.7 to about 98 parts dry gypsum is believed to be useful.

Cellulose ether is then combined with at least one second material. Block 4. In an important aspect of some invention embodiments, the combination of the cellulose ether with the at least a second material is configured to delay solubilization of the cellulose ether. It has been discovered that this provides important benefits and advantages in various invention embodiments, with an example being delayed thickening effects of the cellulose ether on the gypsum slurry. These benefits and advantages will be illustrated in greater detail below when discussing various embodiments of the invention.

The step of Block 4 and the at least a second material may be any of several suitable steps and materials useful to achieve a delayed solubilization of the cellulose ether. The step of Block 4 may include, for example, combining cellulose ether with water at a temperature selected to delay solubilization of the cellulose ether. Also, in some invention embodiments, the at least a second material substantially encapsulates the cellulose ether. Encapsulation may occur through forming an emulsion (such as an inverted emulsion) that includes cellulose ether as the dispersed phase and the at least a second material making up the continuous phase.

In systems and methods of the invention that utilize an inverted emulsion, further steps of removing water from the slurry to cause the surface tension of the slurry to cross a threshold at which the inverted emulsion reverses phases are performed, wherein the dispersed phase cellulose ether is released into the slurry. This step may be performed, for example, through drying or otherwise removing water. This may take place as the slurry sets on or between wallboard facing sheets or as the wet set wallboard is dried in a kiln/oven (in the case of a wallboard application), or as the slurry is compressed and water driven off in a press when forming a fiberboard, or at other times. This step may also be performed by allowing water in the slurry to be absorbed by the gypsum hemihydrate as it converts to its dihydrate form.

In still an additional example step of Block 4, dry cellulose ether is encapsulated through spray coating. The spray coated material may be configured to delay solubilization of the cellulose ether. One example spray coating is a cross linker.

The combined cellulose ether and at least a second material are then added to the slurry. Block 6. This step may include, for example, adding the cellulose ether emulsion or dry coated cellulose ether solid formed in the step of Block 4 to the container such as a mixer or headbox which contains the gypsum slurry. In subsequent steps that have been collectively referred to as a single step of Block 8, the slurry is deposited on a moving receiver and dried to form a gypsum board product (such as wallboard or fiberboard) is formed.

The general steps of blocks 2-8 have been presented to illustrate one example of the invention in its broad scope. As will be discussed in detail herein below, various methods and systems of the invention may include many variations of the steps of Blocks 2-8 as well as numerous additional steps. For example, in one embodiment of the invention, further steps of using a sensor to monitor at least one physical property of the slurry and using the resulting measurements to change one or more of the quantity and quality of the slurry are performed in response to a change in the measured physical property of the slurry. In order to best illustrate these various methods of the invention, reference to schematic illustrations of systems of the invention will be made.

Example Method and System

Emulsions (Wallboard)

As indicated above, in some example systems and method of the invention the step of Block 4 includes forming an emulsion with cellulose ether as a dispersed phase. An emulsion is a mixture of two immiscible (unblendable) substances. One substance (the dispersed phase) is dispersed in the other (the continuous phase). Emulsions are generally not stable and are formed through input energy (e.g., stirring or mixing, including high shear). A surfactant (also known as an emulsifier) may be added to stabilize the emulsion.

In some (but not all) invention embodiments, the emulsion formed through the step of Block 4 is an inverted emulsion. In an inverted emulsion, the dispersed and continuous phase of the emulsion are "reversed" or otherwise broken down—the dispersed phase becomes the continuous and the continuous becomes the dispersed. Inverted emulsions are characterized in that changing surface tension between the dispersed and continuous phases may cause them to "break" and to revert to an emulsion (i.e., change phases back to a "pre-inverted" or "non-inverted" form) where the dispersed phase becomes the continuous, and the continuous becomes the dispersed.

The inverted emulsion useful in invention embodiments includes a dispersed phase cellulose ether material and a continuous aqueous phase, so that the reversal of phases when the inverted emulsion breaks will result in the cellulose ether becoming the continuous phase and available for dispersion and linkages in the developing gypsum crystalline matrix. It will be appreciated that as used herein an inverted emulsion is considered to be one category or type of emulsion, and therefore that use of the term emulsion is intended to broadly encompass and include inverted emulsions.

A suitable surfactant may be used to form either the emulsion or the inverted emulsion. Many different cellulose ethers and surfactants will be useful in different methods of the invention, and may be selected depending on particular product application, process parameters, and like factors. Some particular examples are provided in the description of different invention embodiments herein below.

Figure 2:
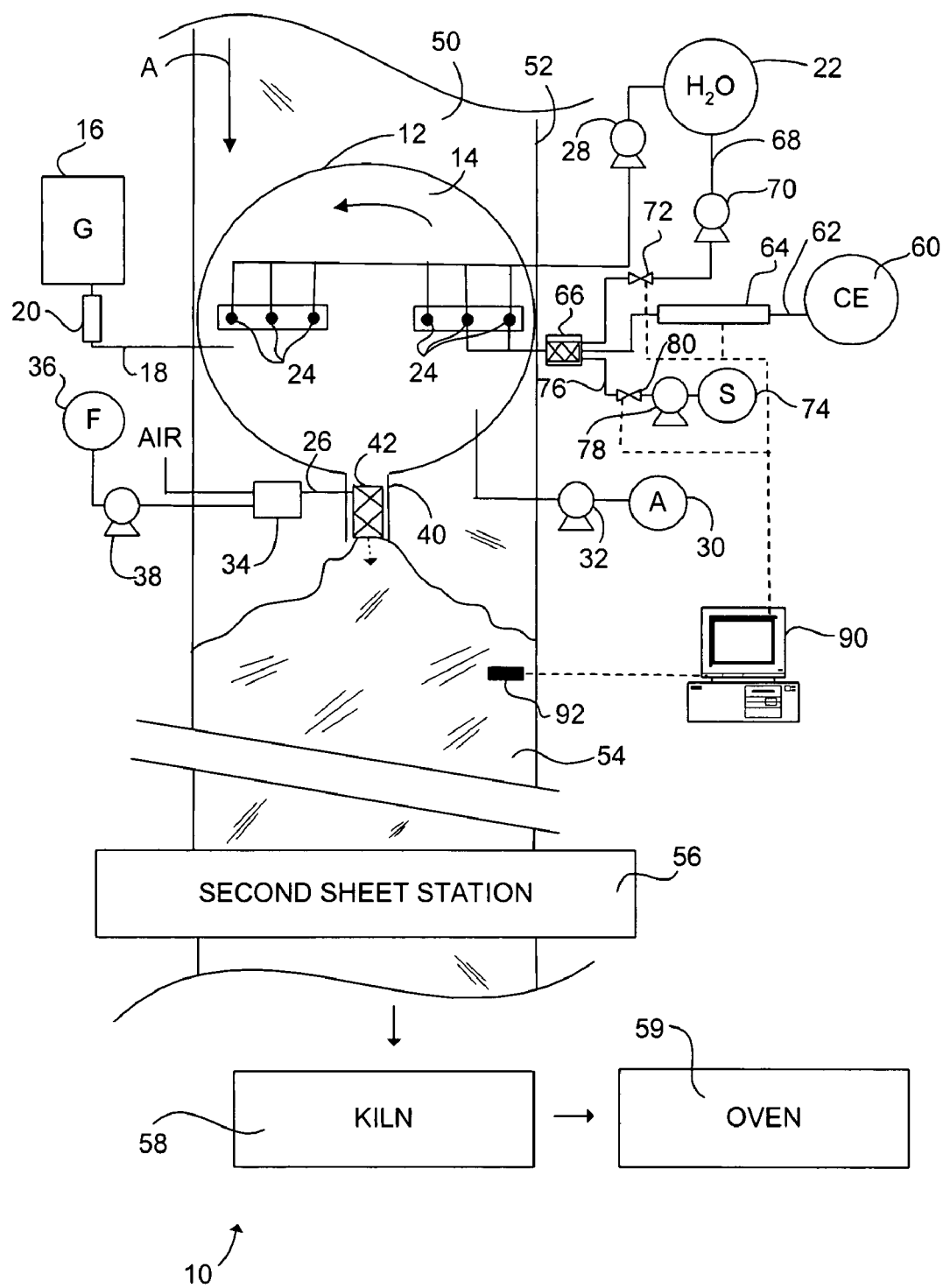
FIG. 2 is a schematic useful to illustrate a second example method and system of the invention directed to use of emulsions with wallboard applications.

FIG. 2 schematically illustrates one example system 10 which is useful for practicing methods of the invention, including methods for continuously making a gypsum wallboard product. While individual gypsum panels can be made in a batch process, continuous processes that form gypsum board into a continuous production line panel which can then be cut into individual panels of desired lengths generally offer efficiency and commercial advantages.

Referring to the schematic of FIG. 2 by way of further illustration, a container such as a rotating pin mixer 12 is provided for mixing the solid and liquid components of the slurry in any order. The mixer 12 includes a mixing chamber 14. Rotating pin mixers are generally known in the art, and detail herein is not provided for the sake of brevity. Briefly, the mixing chamber 14 has upwardly and downwardly extending pins (not illustrated). One of the upward or downward extending sets of pins rotate relative to the other. The rotation of the pins causes a circular motion and mixing of the solids and fluid contained in the mixing chamber 14. Interaction between the circulating fluid and the stationary pins enhances mixing. In addition to the pin mixer 12, other mixers are contemplated for use in invention embodiments and will be known to those knowledgeable in the art.

Dry components of the slurry, including a calcined gypsum or stucco and any dry additives, are preferably blended together prior to delivery to the mixer 12. The dry components are then added to the liquid water in the mixing chamber 14, and blended until the dry components are moistened and homogenized. In the schematic of FIG. 2, solid calcined gypsum particles are continuously delivered to the mixing chamber 14 from calcined gypsum supply 16 using conduit 18. Supply 16 can be a tank, bin, or the like. In one example system, supply 16 is a bin, and delivery conduit 18 is a conveyor. The metering device 20 may comprise an online metering scale or the like. A substantially continuous supply of calcined gypsum is thereby delivered to the mixing chamber 14, with the metering device 20 controlling the amount provided. It can be desirable to deposit the gypsum in the mixing chamber 14 over a dispersed area to facilitate mixing.

Water is delivered from water supply 22 to the mixer 12. A plurality of nozzles 24 is arranged within the mixing chamber 14 for dispersing the delivered water over a relatively large area of the chamber 14 diameter, which may be, for example, at least half the diameter. The nozzles 24 communicate with the water supply 22 via a pipe 26. One or more pumps 28 may be provided to pressurize the water. One or more metering devices may be provided to control the quantity of water delivered to the mixer 12. The metering device may be, for example, a valve (not illustrated), a metering pump (such as pump 28), the nozzles 24, other devices, or combinations of these. A heat and mass balance is desirably maintained on the mixer 12 to control the quantity and quality (including physical properties) of the slurry being prepared.

Any amount of water may be used to make the gypsum slurry as long as the slurry has sufficient fluidity for the application being considered. The amount of water varies depending on factors including the source of the gypsum, the manner in which it is calcined, the additives and the product being made. For many wallboard applications, a water to gypsum weight ratio of about 0.18 to about 0.80 is used, other applications use a ratio of about 0.25 to about 1.20, others applications use a ratio of about 0.6 to about 0.86, and still other applications use a ratio of about 0.2 to about 0.5. Other ratios may also be used. Excessive water may be removed from the resulting slurry using downstream driers, but such removal adds energy costs and is therefore often avoided.

The slurry will typically have a high viscosity and be relatively fast setting. The viscosity may be similar, for instance, to that of a medium oil to molasses. Slurry residence time in the mixing chamber 14 will vary, but in many applications the residence time is less than 30 seconds and may be only several seconds or less. In this short time, a substantially homogeneous slurry is desirably prepared. To achieve efficient mixing of this thick and fast setting slurry, the mixer 10 may utilize high RPM's, with an example being about 250 to 800.

Some embodiments of the invention also provide for addition of one or more solid or liquid additives to the slurry from additive supply 30. An additive delivery and metering device(s) may be provided, with an example being a metering pump 32 (for use with liquid additives), or an auger or conveyor for use with solids. Additives can be useful to modify one or more properties of the final wallboard product. Additives are used in the manner and amounts as are known in the art. Although supply 30 has been illustrated as communicating directly with the mixing chamber 14 in the example system 10, in other systems it may communicate directly with the gypsum supply 16, such as, for example, connection to supply line 18 (particularly in the case of solid additives which may be added to the solid gypsum prior to introduction to the mixer 12).

Examples of additives that are useful with some systems and methods of the invention are provided herein by way of further illustration. It will be understood, however, that the examples provided are not exhaustive of those that may be useful with systems and methods of the invention. Concentrations are reported in amounts per 1000 square feet of finished board panels ("MSF").

Starches can be used in amounts, for example, from about 3 to about 20 lbs./MSF (14.6 to 97.6 $g/m^2$) to increase the density and strengthen the product. Glass fibers are optionally added to the slurry, with example concentrations of up to about 11 lb./MSF (54 $g/m^2$). Up to 15 lb./MSF (73.2 $g/m^2$) of paper fibers can also be added to the slurry. Wax emulsions can be added to the gypsum slurry in amounts up to 90 lbs./MSF (0.4 $kg/m^2$) to improve the water-resistency of the finished gypsum board panel.

Set retarders (up to about 2 lb./MSF (9.8 $g/m^2$)) or dry accelerators (up to about 35 lb./MSF (170 $g/m^2$)) can be added to modify the rate at which the hydration reactions take place, and/or to speed up the hydration reaction. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another example accelerator. HRA, another common accelerator, is calcium sulfate dihydrate freshly ground with sugar at a ratio of about 5 to 80 pounds of sugar per 1000 pounds of calcium sulfate dihydrate. It is further described in U.S. Pat. No. 2,078,199, herein incorporated by reference. All three of these are example accelerators. Others are contemplated.

Another example accelerator is known as wet gypsum accelerator or WGA. A description of the use of and a method for making WGA is disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The WGA can be used in amounts ranging from about 5 to about 80 pounds per thousand square feet (24.3 to 390 $g/m^2$) of board product.

Other example additives to the wallboard are biocides to reduce growth of mold, mildew or fungi. Depending on the biocide selected and the intended use for the wallboard, the biocide can be added to the facing material, to the gypsum core or both. Examples of biocides include boric acid, pyrithione salts and copper salts. When used, biocides are used in the facings in amounts of less than about 1000 ppm.

In addition, the gypsum composition optionally can include a starch, with examples including a pregelatinized starch and/or an acid-modified starch. The inclusion of the pregelatinized starch increases the strength of the set and dried gypsum cast and the acid modified starch minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods.

Suitable examples of pregelatinized starch include, but are not limited to, PCF 1000 starch, commercially available from Lauhoff Grain Company, Danville, Ill. and AMERIKOR 818 and HQM PREGEL starches both commercially available from ARCHER DANIELS MIDLAND Company, Decatur, Ill. If included, the pregelatinized starch is present in any suitable amount. For example, the pregelatinized starch can be added to the mixture used to form the set gypsum composition such that it is present in an amount of from about 0.5% to about 10% percent by weight of the set gypsum composition. Starches are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire properties can be improved by the addition of vermiculite. These and other known additives are useful in the present slurry and wallboard formulations.

The example system 10 of FIG. 2 further provides for introduction of a foaming agent to the slurry. Foams are useful to control the density of the resultant wallboard core material and for other purposes. Many foaming agents are well known and readily available commercially, with examples including those from GEO Specialty Chemicals, Ambler, Pa. Useful foams include aqueous foams, and can be generated by high shear mixing in a foam mixing chamber 34 of air with a liquid mixture of water and an appropriate foaming agent stored in foam supply 36. A pump 38 may be provided, as well as a metering device such as a valve or a metering pump (e.g., pump 38) to provide control over the quantity and quality of foam provided. Degree of mixing (e.g., configuration and speed of high shear mixing) in mixing chamber 34 can also be useful to control the properties of the foam.

The foam can be delivered and mixed with the slurry as it exits the mixing chamber 14 through a discharge conduit 40. See, for example, U.S. Pat. No. 5,683,635, herein incorporated by reference. The conduit 40 may comprise, for example, a pipe or other structure leading from the mixing chamber 14. The discharge conduit 40 can also include a static mixer 42 for ensuring good mixing of the foam into the slurry. Static mixers such as the mixer 42 are known in the art, and generally include a plurality of sequential baffles, trays, blades, or other stationary structures that are arranged with one another such that one or more fluid streams flowing therethrough are thoroughly mixed with one another and a single homogeneous stream results.

The slurry is continuously dispensed through the one or more discharge conduits 40 from the mixing chamber 14 and deposited onto a moving wallboard facing material 50 being carried on a high speed conveyer 52 in the direction shown by arrow A in FIG. 2. In the schematic of FIG. 2 the deposited slurry has been identified as element number 54. In many example systems, the mixer 12 can be arranged above and generally centered over the conveyor 52, with the discharge conduit 40 depositing slurry 54 close to the center of the conveyor 52. Slurry is urged out of the mixer 12 with a velocity through centrifugal force and through continuous addition of water, dry gypsum, and other additives. Once deposited, the slurry 54 relatively quickly spreads over the entire width of the wallboard facing material 50.

Wallboard facing materials are well known to those knowledgeable in the art. Multi-ply paper is one example facing material, with other examples including single-ply paper, cardboard, polymers, non-wovens, plastic sheeting and the like. Another paper cover sheet is optionally placed on top of the slurry at a downstream station, which has been schematically illustrates as station 56 in FIG. 2 downstream of the mixer 12. Downstream of station 56 the slurry 54 is sandwiched between the two facing materials which become the facings of the resultant gypsum wallboard panel.

The thickness of the resultant board is controlled by the amount of slurry 54 deposited, a forming plate (not illustrated), and other parameters. The edges of the board are formed by appropriate mechanical devices (not shown) which continuously score, fold and glue the overlapping edges of the paper. While the shape of the slurry 54 is maintained, the calcined gypsum is kept under conditions sufficient (which can be, for example, temperature of less than about 120° F.) to react with a portion of the water to set and form an interlocking matrix of gypsum crystals.

The thus formed gypsum wallboard material may be subjected to drying downstream of the station 56 to remove excess water. A multiple-stage drying process is often used in commercial processes. A first stage may include about 20-30 mins. in a high temperature kiln (or first stage of a single multi-stage kiln) (illustrated schematically as kiln 58 in FIG. 2) operating at air temperatures of about 300°-400° F. (about 148° C.-204° C.) or more to rapidly remove excess water. A second stage can include an oven or second stage of a multi-stage kiln schematically illustrated as oven 59 in FIG. 2 operating at a lower temperature configured to limit calcination of the board. It will be appreciated that although the stages have been illustrated as distinct elements 56 and 59 in FIG. 2, both stages may be combined in a single kiln.

Referring once again to the initial preparation of the gypsum slurry and to the discussion of cellulose ether provided above, the example system 10 is configured to take advantage of the benefits and advantages that have been discovered to accompany inclusion of cellulose ether in a gypsum slurry and resultant gypsum based board or panel product. Along with the discovery of these benefits and advantages, however, practical difficulties associated with accomplishing effective addition and mixing of the cellulose ether have been realized.

For example, cellulose ethers can form gels or other highly viscous solutions when dissolved and thereby act as a thickener. This presents problems in introducing the cellulose ether material to the slurry, and in achieving effective mixing and dispersion of the cellulose ether in the slurry. The configuration of the example system 10 has been discovered to address these and other problems.

Methods and systems of the present invention, with the system 10 being one example, are believed to address these and other problems. For example, through practice of a method or system of the invention, it is believed that a cellulose ether such as methyl cellulose can be added to a gypsum slurry with minimal or no detrimental effects on the slurry (such as foam destabilization), while taking advantage of the benefits provided through presence of a cellulose ether in the final board product.

In one example system and method of the invention, cellulose ether is added to the gypsum slurry as an emulsion containing discrete droplets of cellulose ether as its dispersed phase in an aqueous continuous phase. Other continuous phases are contemplated, with examples including inert liquids that may be relatively easily driven off through drying. For example, other materials of lower boiling points or higher vapor pressures than water can be used so that the release of the liquid cellulose ether can be more easily separated from the water concentration and surfactant destabilizing effect of the evaporating (or chemically combining with hemihydrate) water. This will provide advantages in lowered drying energy requirements. Further, the water continuous phase can include a cosolvent, with examples including xylenes or toluene.

The dispersed cellulose ether phase is not released until the emulsion "breaks"—when the continuous phase is sufficiently dried or otherwise removed from the slurry. In other methods and systems of the invention, the emulsion will be an inverted emulsion with cellulose ether as the dispersed phase. In these systems and methods, the dispersed cellulose ether will be released when the inverted emulsion breaks—when the inverted emulsion reverses phases and the dispersed phase becomes the continuous phase. In some methods and systems of the invention the reversing of inverted phases will occur as a result of the removal of water from the slurry after the slurry has been well mixed and deposited on the moving conveyor.

These method steps and corresponding elements of the system 10 are believed to thereby achieve a delayed reaction of the cellulose ether in the gypsum slurry that allows the slurry to be well mixed, deposited on a wallboard sheet, and the foam to be well mixed in the slurry and to at least begin to solidify before direct interaction of the cellulose ether with the slurry occur. Because the cellulose ether in the emulsion (or inverted emulsion) is encapsulated or enveloped within the continuous water phase when initially introduced to the slurry, it does not substantially gel or increase the viscosity of or otherwise interact with the gypsum slurry. As the gypsum hemihydrate absorbs water from the slurry and converts back to a dihydrate form to form the interlocked crystal network of the final product, the surface tension of the slurry changes. It will be appreciated that as used herein the term "absorbs" when used in this context is intended to be broadly interpreted. For example, gypsum hemihydrate "absorbing" free water may include gypsum hemihydrate reacting with or otherwise taking free water. The term "absorbing" is used for convenience to describe this process.

When the surface tension crosses some threshold, the emulsion "breaks" and the dispersed phase cellulose ether is released into the slurry, which may now be in the form of a partial or complete matrix. It is noted that the term "slurry" is used herein for convenience in all invention embodiments and is intended to be broadly interpreted to include not only the initial wet slurry, but further its various subsequent forms as it dries, forms a matrix, hardens, and otherwise undergoes changes downstream from the headbox/mixer.

In the case of an inverted emulsion, after a threshold amount of water has been taken or absorbed the inverted emulsion breaks (phases reverse) to release the cellulose ether into the slurry. The threshold will depend on factors such as the particular surfactant being used, its concentration, slurry pH, temperature, and others. The example system 10 is configured to perform a method of the invention that takes advantage of these discoveries.

Turning once again to structural elements and steps of using the same, the system 10 includes a cellulose ether supply 60 with a supply conduit 62. The conduit 62 may be a conveyor or the like in the case of solid cellulose ether material, or a pipe or the like in the case of liquid. A variety of different cellulose ether materials may be contained in the supply 60, which may be in liquid (including a gel) or solid form. Examples of suitable cellulose ethers believed to be useful with methods and systems of the invention include, but are not limited to, ethyl celluloses, propyl celluloses such as hydroxypropyl cellulose, and methyl celluloses. Commercially available examples include the CULMINAL products identified herein above.

A transfer device 64 which may be an auger, conveyor, or other transfer device in the case of a solid, or a metering pump, valve or the like in the case of liquid cellulose ether supply, is provided to deliver the cellulose ether material from the supply 60 through the conduit 62. The transfer device 64 is suitable to control the quantity of cellulose ether material transferred from the supply 62. The supply 62 communicates with an emulsion forming chamber 66, which may be for example a high shear mixer or emulsifier or other mixer suitable for forming an emulsion.

The water supply 22 likewise communicates with the high shear mixer 66 via a second conduit 68. A pump 70 is provided to transfer the water to the mixer 66, and a metering valve 72 to control the quantity delivered thereto. A surfactant supply 74 contains a surfactant which may be selected based on application specific parameters, including but not limited to the particular cellulose ether being used, the concentration being used, the desired conditions (such as surface tension and water temperature) under which the emulsion (or inverted emulsion) breaks, and the like. Suitable surfactants include anionic and cationic surfactants, with particular examples including SURFONYL from Rohm and Haas Chemicals, Pennsylvania, SORBITAN from ICI Industries, and similar surfactants. Some surfactants may be selected for use based on their ability to result in an inverted emulsion. Those knowledgeable in the art will appreciate that inverted emulsions can also be formed through manipulation of temperature, pH, concentrations, and the like.

The surfactant supply 74 communicates via a conduit 76 with the high shear mixer 66. A pump 78 and metering valve 80 are provided to transfer the surfactant and to control the amount of surfactant provided. Should the surfactant be provided in solid form, the pump 78 and valve 80 can be replaced with suitable transfer and metering devices, such as a conveyor, auger, scale or the like.

Although separate supplies for each of the cellulose ether, surfactant, and water has been shown in FIG. 2 (supplies 60, 74 and 22, respectively), it is contemplated that some materials may be stored together in other example systems and methods of the invention. Two or more of the cellulose ether, water and surfactant, for example, could conceivably be combined in a single supply. Also, the mixer 66 has been illustrated as directly linked to each of the supplies 60, 74, and 22 in FIG. 2. In other example systems and methods of the invention, some of the supplies 60, 74 and 22 may communicate with one another upstream of the mixer 66 and deliver a combined stream to the mixer 66. For example, the surfactant from supply 74 could potentially be combined with either of the water from supply 22 or cellulose ether material from supply 60 upstream of the mixer 66 and delivered thereto in a combined stream.

The example high shear mixer 66 is configured to mix the cellulose ether material from the supply 60, water from the supply 22, and surfactant from supply 74 to form an emulsion or inverted emulsion in which the cellulose ether forms a dispersed phase and the water the continuous phase. Those knowledgeable in the art will appreciate that the high shear mixer 66 may be configured in many different manners. In one example system and method of the invention, the mixer 66 includes a static mixer suitable for mixing the three materials to produce the emulsion or inverted emulsion. The particular configuration of the mixer 66 may depend at least to an extent on quantities of the three materials being mixed, the stream velocities, and the particular cellulose ether and surfactant. High shear mixers may also include static mixers that rely on high velocities through the stationary mixing elements to achieve high shear mixing, rotating disc or blade element mixers with high tip velocities (>1000 fps) or pot mixers with high shear blade impellers acting in a tank of sufficient volume to provide the necessary retention time to achieve the desired particle size.

It will also be appreciated that to prepare a suitable emulsion (including an inverted emulsion), differing amounts of the cellulose ether, water and surfactant will be required. Many different emulsions will be suitable, so long as the cellulose ether remains in the dispersed phase and the water the continuous phase.

In one example emulsion, the concentration of cellulose ether is about 10% or less in water. Surfactants can be provided in suitable concentrations. The cellulose ether droplets may be of varying sizes in the emulsion, with an example being about 20 to 200 microns. The emulsion when suitably prepared may have a milky white appearance with a slight tinge of blue.

The high shear mixer 66 communicates with the mixing chamber 14. In the example system 10, the inverted emulsion is delivered via a plurality of the nozzles 24 together with water being communicated to the dry gypsum for preparing the slurry. It is believed that this may be useful to enhance dispersion of the inverted emulsion in the chamber 14, to ensure that the emulsion is delivered with sufficient velocity to maintain its phases, and for other reasons. In the example system 10, the inverted emulsion is delivered via two of the nozzles 24. Other numbers are contemplated, including only a single nozzle 24. Also, it is contemplated to deliver the inverted emulsion through other means, with an example being one or more dedicated nozzles that are generally consistent with nozzles 24.

The emulsion is configured through selection of cellulose ether, cellulose ether concentration, surfactant and surfactant concentration so that it remains as an emulsion while the slurry is resident in the mixing chamber 14. After the slurry 54 has exited the mixer 12 and been deposited on the wallboard sheet 50 being carried on the conveyor 52, the calcined gypsum continues to react with and/or absorb excess water from the slurry causing the surface tension in the slurry (which may now be in the form of set gypsum) to change. Further water removal occurs in the kiln 58 and oven 59. At some point, the surface tension crosses a threshold where the emulsion breaks and the dispersed phase cellulose ether is released into the slurry (which may now be in the form of a set gypsum matrix). In the case of methods and systems of the invention which utilize an inverted emulsion, the changing surface tension crosses a threshold through changing water concentration, changing pH, changing temperature, or other property whereby the phases of the inverted emulsion reverse and the cellulose ether is released into the slurry.

After the emulsion (or inverted emulsion) has broken and the cellulose ether been released, it interacts with the gypsum slurry 54. The cellulose ether may form a gel or otherwise solubilize or disperse with excess water present in the slurry 54 (which may now be in the form of a set matrix). As the excess water decreases, it is believed that the cellulose ether forms a polymer like webbing or film in the slurry 54 (now in a set matrix form), thereby enhancing gypsum-to-gypsum bonding and gypsum-to-non-gypsum materials, such as wallboard sheet material.

Because the release of the cellulose ether does not occur until after the slurry 54 has been deposited on the facing sheet 50, its thickening effects are advantageously avoided while the slurry is being mixed in the mixing chamber 14. Additionally, in some example systems and methods of the invention, the inverted emulsion does not break in the slurry 54 until after the foam introduced in the discharge conduit 40 has been fully dispersed in the slurry 54 and resultant bubbles or foam voids have begun to stabilize in the slurry/matrix. Potential foam destabilization effects of the cellulose ether may thereby be reduced or even avoided.

In one system and method of the invention, an objective is thereby to release the cellulose ether after the foam has started to become a structural part of the matrix due to the setting of the gypsum around the exterior of the foam bubble. The foam integrity is maintained. If the cellulose ether is released too soon before the foam shell starts to become rigid, the surface tension change caused by the liquid cellulose ether can destabilize the surfactant or soap used to maintain the spherical structure of the bubble and cause less desirable or weaker foam structures to be formed.

In the example system and method, the discrete post emulsion droplets are intimately mixed with the gypsum slurry. The use of the agitation mixes the liquid cellulose ether droplets before they can coagulate to form a cellulose ether set. One advantage is that the immediate chemical or dilution change allows the cellulose ether to become available for bonding more rapidly than waiting for the cellulose ether to dissolve in the water phase in the gypsum slurry.

The system 10 and methods utilizing it also offer advantageous control over the location where the methyl cellulose is released into the slurry. The required surface tension threshold at which the emulsion breaks (including at which an inverted emulsion reverses phases) can be controlled, at least to a reasonable extent, by selection of surfactant and concentration of surfactant, the water removal from the slurry system by gypsum hydration or drying, by resulting pH changes, by temperature changes, or through other property changes. In methods and systems of the invention, different surfactants and different quantities of surfactants can be used to cause the emulsion to release the cellulose ether into the setting slurry at different locations along the wallboard or fiberboard manufacture process.

For example, a first surfactant in a first quantity may be selected to cause an inverted emulsion to reverse phases in a first surface tension range. This range may be expected to occur just after the slurry has been deposited on the wallboard facing material while the gypsum initially sets and reacts with or absorbs water to convert from its hemihydrate to its dihydrate state.

In other methods and systems of the invention, a second surfactant (or a second quantity of the first surfactant) may be selected to cause the inverted emulsion to reverse phases in a second surface tension range. This second surface tension range may be expected to exist at a different location along the board manufacture process. For example, this second surface tension range may correspond to a lower water content than the first surface tension range, and may be expected to exist while the board dries in a kiln.

Methods of the invention may also include steps of selecting surfactants to specify the depth in the slurry 54 (measured across the thickness between facing sheets) of the deposit of the cellulose ether within the body of the board, specifying a location of heaviest concentration of the deposit, or causing the cellulose ether to migrate to the paper/gypsum interface. This can be useful to provide enhanced strength in areas of the board that are most prone to failure. A particular surfactant in a particular quantity may be selected, for instance, to cause the inverted emulsion to break when the finished board product is drying in the kiln 58 or oven 59.

As the board dries in the kiln 58, water is evaporated through the facing sheets. It is believed that as this occurs mobility of methyl cellulose released in the body of the slurry 54 is relatively high. It is believed, for example, that a significant portion of the methyl cellulose released in the bulk of the slurry 54 may be carried from the bulk to the interface where the slurry meets the facing sheets. This is believed to offer advantages in some applications where it may be desirable to concentrate the methyl cellulose at the facing sheet. Doing so is believed to provide enhanced flexural strength in at least some applications over concentrating methyl cellulose deeper within the bulk of the board thickness.

The system 10 also includes a controller 90 that is linked at least to the cellulose ether material transfer device 64, to the water metering valve 72, and to the surfactant metering valve 80. Other devices may likewise be connected to the controller 90, with an example being the slurry mixer 12, the gypsum metering device 20, the water pump 28, the kiln 58, the oven 59, and the like. The controller 90 may be, for example, a computer such as a desktop or laptop PC, a server, a networked computer device, handheld processor based device, dedicated processor based controller, an integrated manufacturing process control PLC or other processor based device. Although only one controller 90 is illustrated in FIG. 2, other numbers may be provided. Also, the controller 90 has been illustrated as a stand alone device for clarity only. The controller may be combined or integral with some other device, with an example being the pump 28, valve 72, other device, or a man to machine interface station.

The controller 90 may include a memory with one or more software programs stored thereon for operating each of the cellulose ether transfer and metering device 64, metering valve 72, surfactant metering valve 80, and other devices. The controller 90 may further include a user interface for user control, and may be linked to a network (not illustrated) or to other computers (not illustrated) for remote control and other remote interactive capabilities. The controller 90 can be configured (through storage and execution of a computer program code, for example) to operate the transfer device 64 to control the amount of cellulose ether supplied to the high shear mixer 66 in response to feedback from other process sensors in the manufacturing process.

One or more sensors 92 can optionally be provided and positioned downstream of the mixer 12 and linked to the controller 90. The optional sensors 92 are believed to be useful to address additional needs and problems related to cellulose ether addition in an environment of changing process conditions. Numerous process variables in some real-world gypsum board manufacturing processes can present a constantly changing process environment. Changing variables can include ambient temperature, atmospheric pressure, foam content, slurry temperature, and ambient humidity, raw material fluctuations, for example. These can affect slurry viscosity and other physical properties. Compatibility issues may arise between a particular cellulose ether and one or more of the numerous different additives that can be added to the gypsum slurry in differing amounts.

Because of these changing variables there is some chance that a given quantity of cellulose ether added to the slurry may be acceptable under some conditions but not at others. For example, addition of a particular quantity at a first time may result in no discernable slurry viscosity increases, but the same quantity at a second later time after some process variables have changed may lead to an undesirable viscosity increase. The present invention contemplates methods and systems for addressing these and related problems, including through use of one or more sensors 92.

The sensor 92 is configured to measure one or more physical properties of the slurry 54. For example, the sensor 92 may measure temperature, viscosity, foam content, pH, surface tension, water content, or other slurry property or physical parameters such as slurry width on the forming belt 52. A wide variety of sensors 92 may be used with systems and methods of the invention. Examples include a thermocouple, infrared temperature detector, pH detector, and an on-line viscometer. In some invention embodiments the sensor 92 is configured to provide substantially continuous measurement data, while in other example embodiments measurement data may be provided on an intermittent basis (e.g., every 30 sec., every min., or every 90 sec).

It has been discovered that performing steps of measuring slurry properties such as pH, temperature, or foam content of the slurry can be useful to guide the selection of the quantity and/or quality of the inverted emulsion to add to the slurry. By way of example, the foam content of the slurry 54 may be indicative of any destabilizing effects that the cellulose ether material is having on the slurry 54.

The controller 90 may include a memory with one or more software programs for operating the sensor 92 and for processing data from a sensor, with examples being temperature data. The controller 90 as illustrated in FIG. 2 is additionally configured to respond to changes in one or more measured physical properties of the slurry 54 taken by sensor 92 by altering the amount of emulsion containing cellulose ether delivered to the slurry mixer 12. In this manner, the example system 10 can provide beneficial real-time feedback and control of the addition of cellulose ether, and can dynamically respond to changing properties of the slurry 54 or changing product recipe requirements.

For example, the controller 90 can respond to a measured slurry 54 property such as foam content that exceeds a minimum limit (i.e., the foam has been destabilized) by operating the cellulose ether transfer device 64 to deliver less cellulose ether and/or less surfactant from supply 74 to the high shear mixer 66. Likewise, if the sensor 92 indicates that the foam content is suitably high (e.g., is above a maximum limit) the controller 90 can respond by operating the transfer device 64 and/or the metering valve 80 to cause an increased quantity of cellulose ether and/or surfactant to be delivered to the high shear mixer 66. Variations in the water delivered to the high shear mixer 66 may likewise be made through operation of the pump 70. The controller 90 may additionally be linked to the foam supply pump 38 so that it can increase or decrease the amount of foam (or surfactant within the foam) delivered to the slurry.

In other example methods and systems, the sensor 92 may measure slurry water content or surface tension. The controller 90 may use this data to change the quantity and/or quality of the surfactant to control the location along the board manufacture process where the inverted emulsion breaks. By way of example, it may be desirable to perform the step of causing the inverted emulsion to reverse phases while the board product is drying in either of the kiln 58 or oven 59. The sensor 92 may be located in or proximate to the kiln 58 and/or oven 59 to provide water content and/or surface tension data to aid in accomplishing this step.

The controller 90 may utilize a proportional-integral-derivative (PID) loop control logic or the like to control one or more of the cellulose ether transfer device 64, and/or the metering valve 80, and/or the foam supply pump 38 to maintain one or more properties of the slurry 54 in a desired range:

$$\text{property}_{MIN} \leq \text{property}_{slurry} \leq \text{property}_{MAX}$$

where the property may be, for example, foam content, temperature, viscosity, pH, or the like.

Example System and Method

Emulsions (Wallboard)

As discussed above, addition of cellulose ether to the gypsum slurry has been discovered to provide useful benefits and advantages to the final wallboard product including increased flexural board strength. One potential difficulty associated with the addition of cellulose ether is its thickening effect on the slurry. The example system 10 and method of using shown and discussed above provides one example configuration that is believed to significantly reduce or overcome this difficulty. That example at least partially addresses these problems through steps of providing cellulose ether dispersed in an inverted emulsion to substantially delay thickening and other effects of the cellulose ether. It is believed that such methods and systems of the invention can be useful to, for instance, significantly reduce or eliminate potential destabilization effects of the cellulose ether material of foam added to the slurry.

Figure 3:
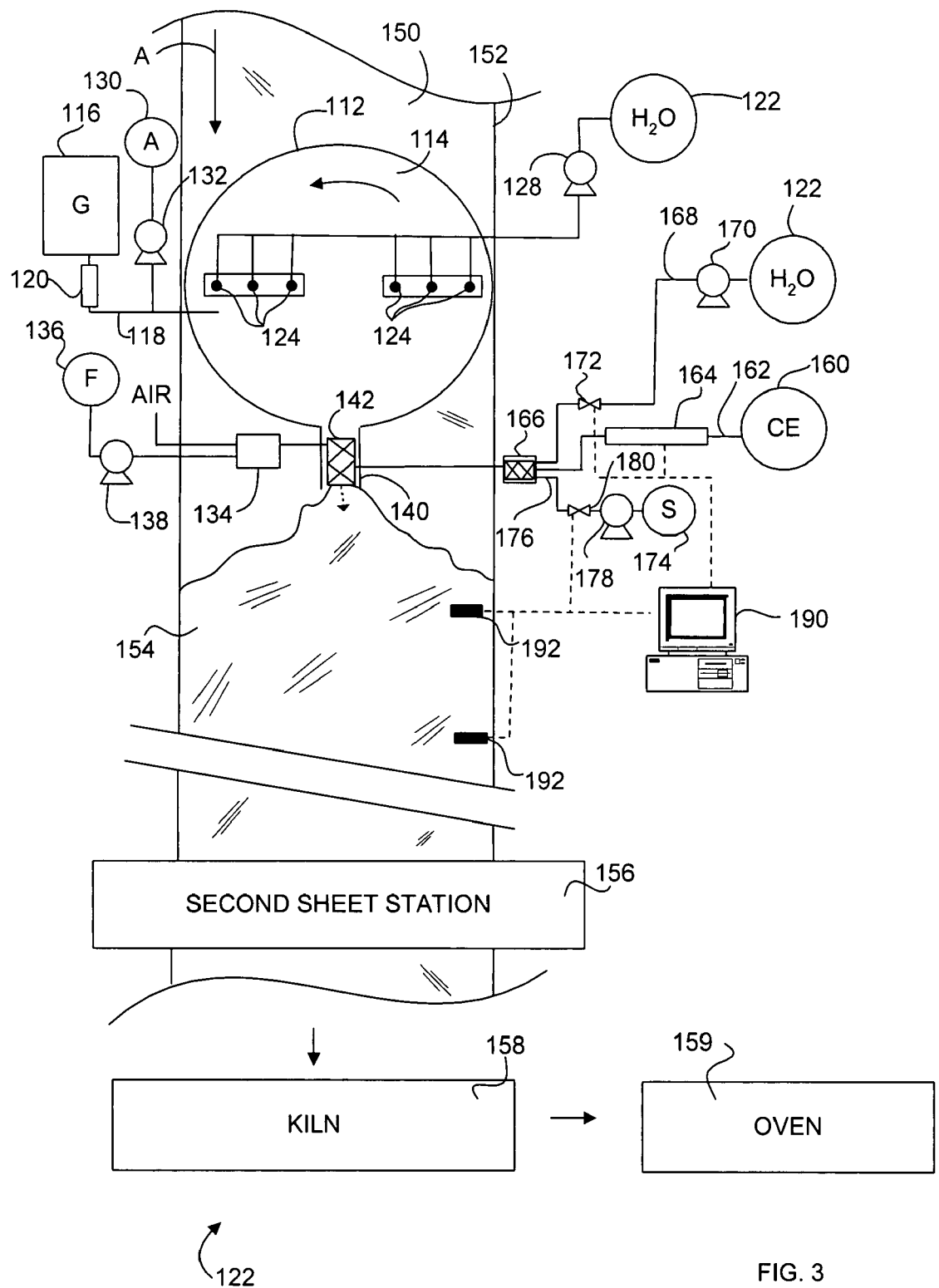
FIG. 3 is a schematic useful to illustrate additional methods and systems of the invention directed to use of emulsions with wallboard applications.

The example system 110 schematically shown in FIG. 3 is an additional system and is useful to illustrate an additional method of the invention that is similar in many respects to the system 10 of FIG. 2 and method for using that system. The system 110 and methods of using it may offer some additional benefits in some applications related to further reduction of risk of foam destabilization. Like element numbers in the 100 series have been used to identify elements of the system 110 that correspond to elements discussed above with regard to system 10. Description of these like elements of system 110 is not provided herein for the sake of brevity. Description may be had through the above discussion with regard to system 10. By way of example, the rotating pin mixer 112 and its mixing chamber 114 of FIG. 3 may be considered to be substantially identical to the pin mixer 12 and chamber 14 of FIG. 2.

Some elements of the example system 110, however, are different or are arranged in a different manner than corresponding elements of the example system 10 and will be discussed herein. Unlike the system 10, the example system 110 is configured to deliver the cellulose ether material at a location downstream from the mixing chamber 114. In particular, the cellulose ether containing emulsion is delivered from the high shear mixer 166 to the mixer discharge conduit 140.

The configuration of the example system 110 of FIG. 3 may provide advantages and benefits over the system 10 of FIG. 2 in some (but not necessarily all) applications. Because introduction to the discharge conduit 140 results in the cellulose ether being introduced to the slurry later than it is in the configuration of FIG. 2 (where it is introduced through nozzles 24 directly into the mixing chamber 14), potential thickening effects of the cellulose ether are further delayed as compared to the configuration of FIG. 2, and the slurry has been allowed to more fully mix prior to introduction of the cellulose ether.

Additionally, the emulsion is delivered from the high shear mixing chamber 166 to the discharge conduit 140 at a location downstream from where the foam is introduced from foam mixing chamber 134. The emulsion may be delivered, for instance, to the static mixer 142 in the discharge conduit 140. Further, it will be appreciated that the static mixer 142 may comprise a set of two static mixers arranged in series, so that the foam may be well mixed with the slurry through a first static mixer 142, and the emulsion delivered to the slurry (which at this point includes the foam) in a second sequential static mixer.

Introducing the emulsion at a location downstream from the foam may further reduce the risk that the cellulose ether will interfere with or destabilize the foam. Before the cellulose ether is introduced, the foam is allowed to be well dispersed in the slurry through the actions of the first static mixer 142 (or at least a portion thereof). Foam bubbles may be formed and dispersed through the slurry before introduction of the cellulose ether. Accordingly, any destabilizing effects of the cellulose ether on the foam should be mitigated as compared to a method where the cellulose ether is delivered upstream of the foam.

It is noted that the configuration of FIG. 3 may be useful for some applications, but may not be necessary (or desired) in other applications. For example, in some applications the particular cellulose ether, the particular foam, and other process parameters may lead to a risk that the foam will be destabilized. In these circumstances, the configuration of FIG. 3 may be useful as compared to the configuration of FIG. 2. In other circumstances, however, process parameters may result in little or no risk of foam destabilization, with the result that the configuration of FIG. 2 may be suitable. The configuration of FIG. 2 may also offer some advantages over that of FIG. 3 related to thoroughness of mixing of the inverted emulsion into the slurry.

In addition to location of emulsion introduction, the configuration of FIG. 3 differs from that of FIG. 2 in a few other respects. For example, two water supplies 122 are provided, with one dedicated to feeding the high shear mixer 166. This might be useful, for example, if the temperature of the water used to form the gypsum slurry were desired to be different from that used to form the inverted emulsion. Also, the additive supply 130 has been configured to deliver additives to the dry calcined gypsum upstream of the mixer 112.

The configuration of FIG. 3 also provides two sensors 192. Two sensors 192 may be useful, for example, to provide additional data concerning the state of the slurry 154. The sensors 192 have been separated from one another by some distance along the conveyor 152. Doing so may provide data concerning the changing properties of the slurry 154 over time as it progresses along the length of the conveyor 152.

Example System and Method

Emulsions (Fiberboard)

Figure 4:
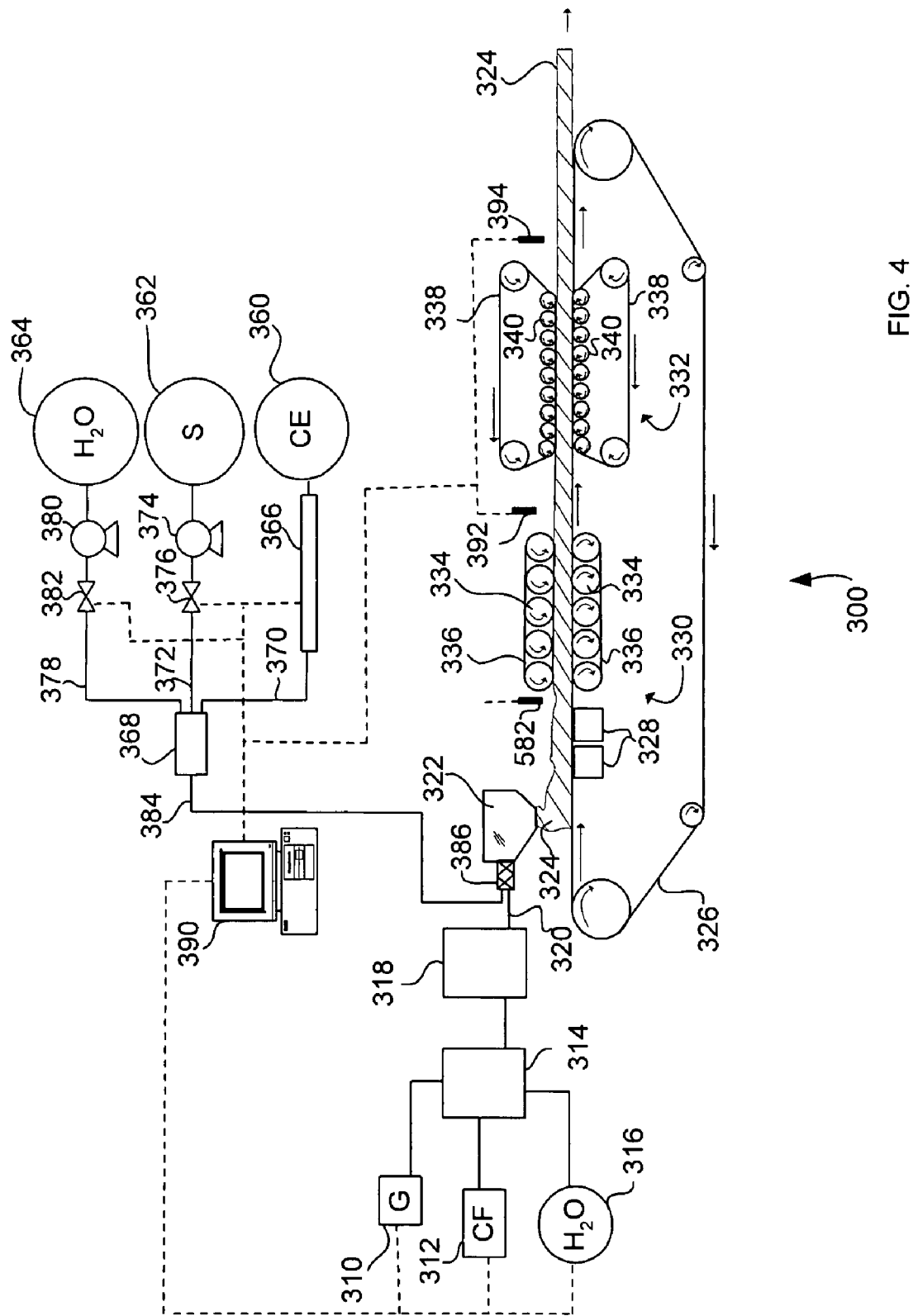
FIG. 4 is a schematic useful to illustrate additional methods and systems of the invention directed to use of emulsions with fiberboard applications.

FIG. 4 is a schematic useful to illustrate an example system and method of the invention for making a gypsum fiberboard product. The system 300 includes a gypsum supply 310 which contains solid gypsum in its dihydrate form and a cellulosic fiber supply 312 containing wood pulp, paper pulp, or other fiber material. The supplies 310 and 312 communicate with a slurry mixer 314. A water supply 316 is likewise in communication with the mixer 314.

The supplies 310 and 312 may communicate with the slurry mixer 314 via one or more augers, conveyors, pipes, or other devices useful to carry solids. One or more metering devices, with an example being a scale and a positive displacement metering pump (not illustrated) may be provided to control the quantity of gypsum and cellulosic fiber supplied to the mixer 314. A metering valve or pump (not illustrated) may likewise be provided to control the quantity of water supplied from supply 316 to the mixer 314. The mixer 314 is configured to mix the gypsum dihydrate, the cellulosic fiber, and the water into a slurry. It can include agitation means, and may by way of example be an agitated slurry tank.

The mixer 314 communicates with a reactor or calciner 318, which is configured to heat the slurry under pressure to elevated temperatures to cause the gypsum to go into solution, recrystallize out, and to form crystals of alpha hemihydrate. By way of example, the calciner 318 may be configured to heat the slurry to a temperature of about 290° F. (143° C.) under sufficient pressure to keep the water in liquid form. Other temperatures may also be useful. When heated to these temperatures, the gypsum dihydrate is calcined and forms gypsum hemihydrate crystals. At least a portion of the crystals form on the cellulosic fiber materials, including in surface imperfections such as cavities, crevices, and the like.

The heated slurry exits the calciner 318 through a conduit 320, which may comprise a pipe, channel, blow tank or the like. The conduit 320 is at or near atmospheric pressure, causing the slurry to quickly cool to about 212°-215° F. as a small portion of the water component boils off. The slurry is delivered to a container such as the headbox 322 or an intermediate surge tank or blow tank prior (not illustrated) to the headbox 322. The slurry, which has been identified as element 324 downstream from the headbox 322, is deposited by the headbox through a lower conduit onto a moving receiver or conveyor 326 (sometimes referred to as forming wire) on a forming table. The headbox 322 is generally configured to aid uniform spreading of the slurry 324 across the width of the conveyor 326, and may be generally configured as an elongated (across the width of the conveyor 326) trough, with an example presented in U.S. Pat. No. 6,605,186 incorporated by reference herein.

The conveyor 326 carries the slurry over one or more vacuum boxes 328, a first press shown generally at 330 and subsequently into a second press shown generally at 332. When deposited on the conveyor 326, the slurry 324 is typically at least about 70% liquid by weight. The conveyor 326 is permeable to water. The vacuum boxes 328 are useful to dewater the slurry 324 by suctioning water from it through the permeable conveyor 326, with the slurry 324 taking on the consistency of a moist cake or mat downstream of the boxes 328. In some applications the slurry 324 may have a water content of about 28-42% (wet basis; 40-70% on a dry basis) just downstream from the vacuum boxes 328.

The first press 330 (which may be referred to as the primary press or dewatering press) includes pairs of cooperating roller sets 334. A porous belt 336 travels over the respective sets of rollers 334. The opposing roller sets 334 cooperate to form a gap there between. One or more of the individual rollers in the sets 334 may be suction rollers, with some applications featuring every other roller being a suction roller. Through compression between the belts 336 and action of the suction rollers from sets 334, the slurry 324 is further dewatered and consolidated in the first press 330. The first press 330 removes most (about 80% or more in some applications) of remaining free water from the slurry 324, and also nips the slurry 324 which now has the consistency of a cake or mat into a desired thickness. Downstream of the first press 330 the slurry 324 is in the form of a mat or cake and may have a moisture content of, for example, about 23-35% (by weight on a wet basis or about 30-55% on a dry basis).

The second or setting press 332 follows the first press 330. The distance between the two presses (whether measured by distance or time) may be set as desired and can be related to the hydration curve of gypsum hemihydrate. Gypsum hemihydrate curves are well known, with an example presented in U.S. Pat. No. 6,197,235 incorporated by reference herein.

The second press 332 includes a pair of opposing belts 338 each traveling over a roller set 340. The belts 338 are generally impermeable to water, and are useful to impart a surface texture or smoothness on the hardening slurry 324. The second press 332 and its belts 338 are also useful to achieve a final calibrated fiberboard thickness as the setting slurry 324 expands against the belts 338. Flexural strength is also improved in the second press 332 as the crystallizing slurry (now in the form of a mat) expands against the belts 338 as the gypsum rehydrates. The second press 332 often features a nip (defined between opposing roller sets 340) slightly thicker than the thinnest nip (defined between opposing roller sets 334) of the first press 330 to decrease thickness variation without disrupting the unset mat by extrusion.

Expansion of the crystal formation with the fibrous particles gripped therein forces the setting slurry 324 (which may have the consistency of a mat or cake) against the belts 338 of the second press 332 as the rehydration rate increases to reach a temperature level which is a certain percentage of the difference between the exothermic rehydration temperature and the highest temperature achieved during rehydration. At this point the slurry 324, now in the form of a hardened mat, exits the second press 332. Depending on the accelerators, retarders, crystal modifiers, or other additives which may be added to the slurry at the headbox 322 or elsewhere (with examples including starch and other additives discussed herein above with reference to gypsum wallboard examples), hydration may take from only a few minutes to an hour or more in the second press 332.

The slurry 324 cools as it passes through the first and second presses 330 and 332. During this cooling, at least a portion, and in some cases substantially all, of the calcined gypsum hemihydrate that was formed under pressure and heat in the calciner 318 absorbs water from the slurry and converts back to its crystalline dihydrate form. Generally only a small portion of the gypsum hydrates in the first press 330 (about 5-10% in some applications), with the majority of the gypsum hydrating to its dihydrate form in the second press 332. Downstream of the second press 332, the slurry 324 has been converted to a gypsum fiberboard of desired dimensions.

The system 300 may be operated on a continuous or semi-continuous basis. Further drying may be provided of the fiberboard that emerges from the second press 332. Also, the system 300 may include other mechanisms and elements— the illustration of FIG. 4 is schematic only. For example, additional blades, rollers and other devices may be provided to further shape and/or remove water from the slurry downstream from the headbox 322.

As described above, it has been discovered that a gypsum fiberboard product may benefit through inclusion of a cellulose ether, with an example being methyl cellulose. As also described above, however, adding a cellulose ether can be cumbersome. If addition of the cellulose ether causes too great of an increase in the slurry tackiness or viscosity, the quality of the final gypsum fiberboard can be disadvantageously affected. The board may stick, for instance, to one of the belts 326, 336 and/or 338 and thereby suffer surface blemishes or even structural cracks.

The configuration of the system 300 (in addition to methods for using the system 300), however, has been discovered to reduce or eliminate such problems. In particular, like the systems 10 and 210 the system 300 is configured to introduce cellulose ether as the dispersed phase of an emulsion. It is believed that doing so provides a beneficial delay in the release of the cellulose ether into active contact with the slurry, and thereby delays thickening and other effects. These benefits and advantages are achieved through additional structural elements of the system 300 as well as particular steps of using the system 300 that are described below.

The system 300 includes a cellulose ether supply 360 containing a cellulose ether material such as methyl cellulose. A surfactant supply 362 contains any of several suitable surfactants as described above. A water supply 364 is also provided. The cellulose ether in the supply 360 may be solid or liquid, but is contemplated as being solid in the example system 300. A transfer device 366 is provided for delivering cellulose ether along a conduit 368. The transfer device 366 may be an auger or conveyor in the case of a solid cellulose ether material, or may be a pump in the case of a liquid. The transfer device 366 is also preferably configured to meter the amount of cellulose ether material delivered from the supply 360 to a high shear mixer 368 via a conduit 370.

The high shear mixer 368 is also connected via a second conduit 372 to the surfactant supply 362. A pump 374 and metering valve 376 along the conduit 372 are useful to deliver desired quantities of the surfactant to the high shear mixer 368. The high shear mixer 368 also communicates via a third conduit 378 with the water supply 364. A pump 380 and metering valve 382 are useful to deliver desired quantities via the conduit 378 to the high shear mixer 368.

The high shear mixer 368 is configured to mix the solid (or in some example systems a liquid) cellulose ether from supply 360 with the surfactant from supply 362 and water from supply 364, and to form an emulsion (which may be, but is not necessarily, an inverted emulsion) with the cellulose ether forming the dispersed phase contained within a continuous phase of water. Any of several configurations will be suitable for the high shear mixer 368, with examples including static mixers and the like. Also, mixers other than a high shear mixer can be used in methods and systems of the invention.

The particular surfactant stored in supply 362, the particular cellulose ether stored in the supply 360, and the relative concentrations of each relative to the water from supply 364 will define many of the qualities of the emulsion. Suitable surfactants include those identified herein above with reference to the method and system illustrated by FIG. 2.

Once formed, the emulsion is delivered via a conduit 384 from the mixer 368 to the slurry as it is held in a container such as the headbox 322. Other invention embodiments can include steps and configurations for delivering the emulsion to other containers, with an example being the mixer 314 or calciner 318, although the headbox 322 may be the most convenient delivery point. To ensure thorough mixing, a static mixer 386 is provided at the headbox 322 inlet. Downstream of the static mixer 386, the emulsion is substantially uniformly mixed with the slurry. The amount of cellulose ether emulsion delivered will vary with particular application. In some example applications, sufficient emulsion may be delivered to result in a range of between about 0.3-2% by weight cellulose ether on a dry weight basis of calcined gypsum to be achieved.

After a relatively short residence time in the headbox 322 during which additional mixing may occur through flow effects of the slurry, the slurry 324 is deposited onto a moving receiver, with an example being the conveyor 326. As water is removed from the slurry 324 as it passes through the first press 330, the water content and surface tension of the slurry 324 changes. The slurry 324 then passes to the second or setting press 332. In the setting press 332 the water content and surface tension of the slurry 324 changes further as the gypsum hemihydrate absorbs free water and converts to its dehydrate form.

As the water content and surface tension of the slurry in the first and second presses 330 and 332 changes, a threshold is passed after which the emulsion may break and release the cellulose ether into the slurry 324. The surface tension at which the threshold is crossed causing the emulsion to break will vary depending on the properties of the particular inverted emulsion being used. In some systems and methods of the invention, this will occur in the first press 330, in others it will occur in the second press 332, and in some it may occur at least partially in both presses 330 and 332, and in other cases, it may occur in the kiln. The emulsion may be engineered to break in a desired location along the first and/or second presses 330 and 332 through selection of an appropriate surfactant, surfactant concentration, cellulose ether, cellulose ether concentration, and other factors.

It may be desirable in some applications for these reasons to utilize an inverted emulsion. While an emulsion will break and release its dispersed phase when the continuous phase concentration has dropped to a certain level, in some applications greater control over the threshold at which the emulsion breaks can be achieved through use of an inverted emulsion. In particular, an inverted emulsion will generally reverse phases at a surface tension threshold that may be more tightly defined than the threshold at which an emulsion (not an inverted emulsion) breaks.

Also, in some applications the threshold at which the inverted emulsion breaks may be higher (e.g., higher water content) than the threshold at which an emulsion (not inverted) breaks. As a result, some advantage may be had in some applications through use of an inverted emulsion, with one example being an ability to more tightly control the location along the manufacturing process where the cellulose ether is released into the slurry. For example, a dual surfactant package could be used, with a first useful to stabilize one phase inside the micelle and the second useful to stabilize the other phase. Other properties that can be varied include functional end groups, length of the backbone chain, and length of the pendant chains of the surfactant.

The system 300 further includes a controller 390 linked to first and second sensors 392 and 394 that are positioned proximate to the slurry 324 and downstream from the headbox 322. In particular, the sensor 392 is positioned substantially between the first press 330 and the second press 332, and the sensor 394 is positioned downstream of the second press 332. Other locations are contemplated, with examples in the headbox 322 or downstream but proximate to the headbox 322. The sensors 392 and 394 may be consistent with the sensor 92/192 described above with systems 10/110, and may be configured to measure one or more physical properties of the slurry 324, with examples including slurry temperature, pH, tackiness, viscosity, surface tension, water content, and the like. In one example, each of the sensors 392 and 394 are infrared sensors configured to measure the temperature of the slurry 324.

In other example systems and methods, the sensors 392 and 394 are configured to measure surface tension directly by measuring surface water content by near infrared meters, radio frequency meters, microwave meters, change in gloss as the water leaves, or sometimes by relative color as the dryer mass is lighter colored than the wet mat.

The sensors 392 and 394 are electrically linked to the controller 390 (linkage shown in dashed line in FIG. 4), which may be consistent with controllers such as the controller 90 (FIG. 2) or other controllers discussed above. Although only one controller 390 is illustrated in FIG. 4, other numbers may be provided. The controller 390 may be a processor based device such as a computer, and may include a memory with one or more software programs for operating each of the sensors 392 and 394, and for processing data from the sensors, with examples being temperature and/or viscosity data. The controller 390 may further include a user interface for user control, and may be linked to a network or with other computers for remote control, alarm and other remote interactive capabilities.

The controller 390 is additionally electrically linked to the cellulose ether transfer and metering device 366 for controlling the amount of cellulose ether material delivered from the supply 360 to the high shear mixer 368. The controller is also linked to the metering valves 376 and 382 to control the amount of surfactant from supply 362 and water from the supply 364 delivered to the high shear mixer 368. In this manner, like the system 10 discussed above, the example system 300 and methods utilizing it can provide beneficial real-time feedback and control of the addition of cellulose ether material to the slurry, and can dynamically vary the amount and/or composition of the inverted emulsion containing cellulose ether added in response to changing properties of the slurry 324 measured by the sensors 392 and 394.

Properties such as the viscosity and tackiness of the deposited slurry 324 can thereby be maintained in a desired range without the need for stopping the continuous manufacturing process, even in the face of changing process parameters such as ambient temperature, different additives, or the like. It has been discovered that one useful physical parameter to measure in the slurry 324 using the sensors 582, 390 and 392 is temperature.

One exemplary location to measure slurry 324 physical property is downstream from the first press 330 and upstream of the second press 332, or proximate thereto (e.g., may also be placed near or within the first press 330 near its exit or within the second press 332 but proximate to its entrance). The sensor 390 can be configured to provide this measurement data, which may be, for example, slurry 324 water content or surface tension. It has been discovered that when adding a cellulose ether such as methyl cellulose to the slurry 324, in many (but not all) applications it may be desirable to have the emulsion (or inverted emulsion) break and the methyl cellulose gel or otherwise dissolve to form a viscous solution in the second press 332 as opposed to the first press 330.

Having the cellulose ether gel in the first press 330 risks undesirable increases in viscosity that may inhibit equal consolidation of the slurry 324 over the conveyor 326, risks blocking water flow out of the slurry 324, and sticking of the slurry 324 to the belt 336. The first press 330 desirably consolidates the existing geometry in slurry 324 thickness as the corresponding pore space is generated by the vacuum removal of water. It preferably should not disrupt the formation of the mat that occurred upstream of the first press 330. Such disruption can result in microfractures in the slurry mat and subsequently lower strength in the final board product. Causing the cellulose ether to gel in (or downstream from) the second press 332, after the majority of excess water has been removed from the slurry 324 and it has adopted close to its final shape reduces or eliminates many of these disadvantageous effects.

It is noted, however, that the present invention also contemplates causing at least a portion of the cellulose ether to gel in the first press 330. Choice of location for gelling will depend, among other factors, on particular process and slurry parameters, as well as the end use application for the gypsum fiberboard.

In the example system 300, the controller 390 can be configured to promote gelling in the second press 332 and prevent or discourage it in the first press 330 (although some degree of gelling may occur in the first press). It may change the quantity and/or quality of the supplied emulsion of cellulose ether material in response to measurements from the sensors 392-394. For example, if the sensor 392 indicated a slurry surface tension or water content above (or below) the threshold where the emulsion breaks, the controller 390 could operate one or more of the metering valves 376, 382 and transfer and metering device 366 to change the quantity and/or quality of the emulsion delivered to the headbox 322. A different concentration of surfactant or cellulose ether, for example, could be supplied to the mixer 368. The controller 390 may also be linked to other devices. By way of example, it may be linked to gypsum and cellulosic fiber supplies 310 and 312 and to water supply 316 to control the quantity of materials from these supplies delivered.

It will be appreciated that the system 300 is schematic only, and has been presented to illustrate some aspects of an example method and system embodiment of the invention. Many alternatives, equivalents, and other modifications are contemplated. By way of example, the presses 330 and 332 may be configured as one press. Many other modifications will be apparent to those knowledgeable in the art. It will further be understood that many of the elements of the systems 10 and 110 for use with wallboard will likewise be useful with fiberboard methods and systems, and vice versa.

Example System and Method

High Temperature Addition

With reference once again made to the flowchart of FIG. 1, the step of Block 4 includes combining cellulose ether with at least a second material, such that the combination is configured to delay solubilization of the cellulose ether. In the above example methods and systems of the invention, the step of Block 4 generally comprised forming an emulsion (or an inverted emulsion). Many other possible steps and configurations are possible for carrying out the step of Block 4. In some other systems and methods of the invention, for example, the step of Block 4 may comprise combining cellulose ether with water at a temperature that is configured to delay solubilization of the cellulose ether. The system 410 of FIG. 5A is configured to carry out such a method.

The example system 410 is similar in many respects to the systems 10, and 110 for making wallboard that were discussed above, and for reasons of clarity and convenience like element numbers have been used in the 400 series. Description of many like elements of system 410 is not provided herein for the sake of brevity. Description may instead be had through the above discussion with regard to systems 10 or 110. By way of example, the rotating pin mixer 412 of FIG. 5A may be considered to be substantially identical to the pin mixer 12 of FIG. 2 (and 112 of FIG. 3). Some elements of the example system 410, however, are different from corresponding elements of the example systems 10 and 110 and will be discussed herein.

Figure 5A:
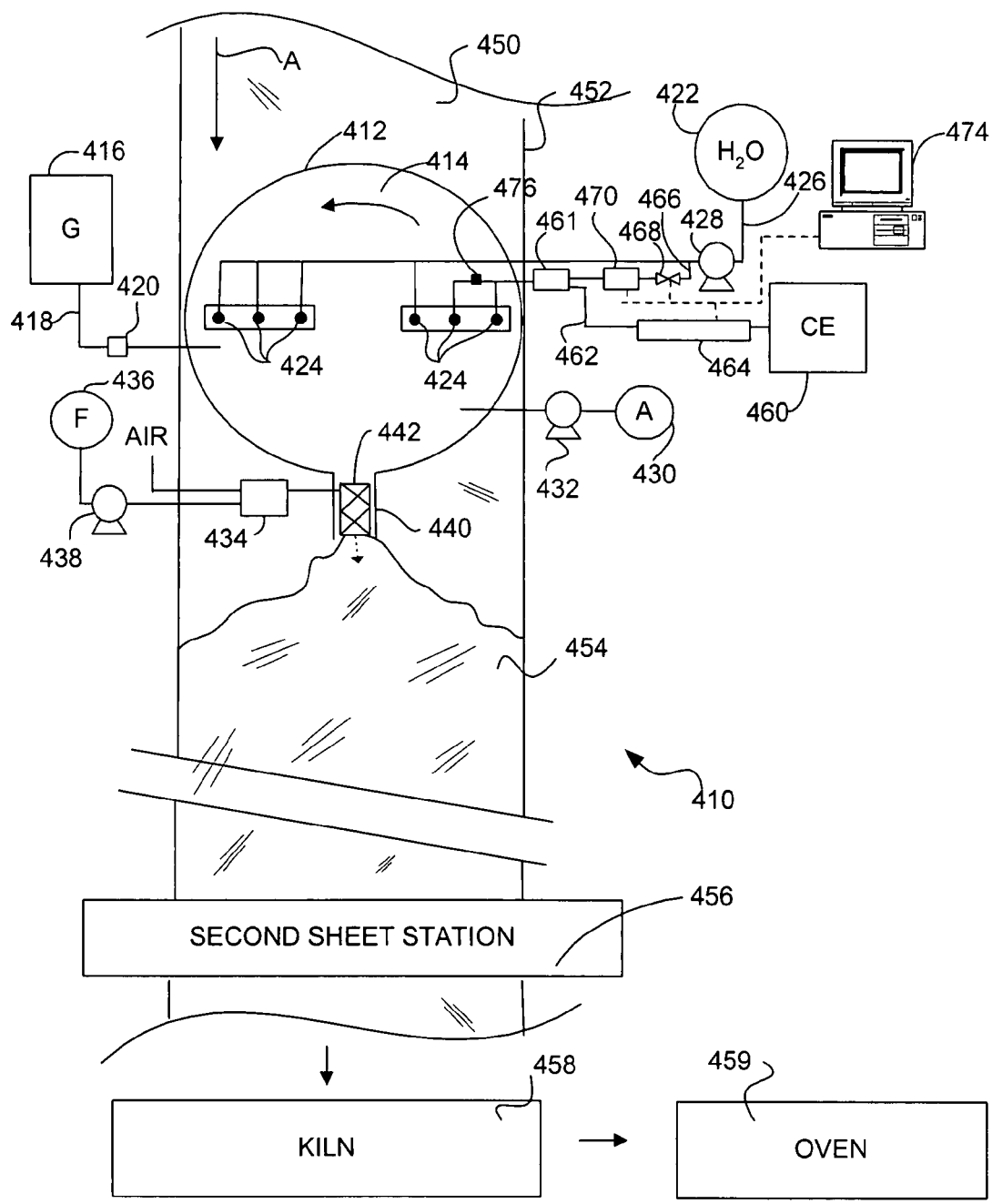
FIGS. 5A-5B are a schematic useful to illustrate additional methods and systems of the invention directed to use of high temperature water with wallboard applications.

Referring now to FIG. 5A and the system 410, it is believed that one way to accomplish effective mixing is through exploitation of cellulose ether's insolubility in water at high temperatures. It is believed that systems such as the example system 410 and methods of using it achieve this. In particular, the example system 410 is configured to combine the cellulose ether material with at least a portion of the water supplied to the mixer 412 at a high temperature selected to prevent the cellulose ether from dissolving or solubilizing when initially combined with the water, and further to delay the solubilization of the cellulose ether in the slurry.

This high temperature water is believed to delay the cellulose ether material from gelling or otherwise dissolving in the slurry until the slurry has exited the mixer 412. Because the cellulose ether is at least partially in solid form in the water stream as it is introduced to the slurry, thickening effects on the slurry are reduced or avoided. Only after the high temperature water stream with cellulose ether particles suspended or otherwise contained therein has been distributed in the slurry (which is typically at a lower temperature, with an example being about 120° F. (49° C.)) and begins to cool will the cellulose ether begin to dissolve and then hydrate to form a gel.

The system 410 includes a cellulose ether supply 460 communicating with a pre-mixer 461 via supply conduit 462. The conduit 462 may be a conveyor or the like in the case of solid cellulose ether material, or a pipe or the like in the case of liquid. A transfer device 464 which may be an auger, conveyor, or the like can be provided to urge the cellulose ether material from the supply 460 to the pre-mixer 461 (the auger or other transfer device may extend for substantially all of the distance between the supply 460 and the mixer 461). A metering device such as a valve (not illustrated) or scale (not illustrated), which may be incorporated with the transfer device 464, controls the quantity of cellulose ether material supplied to the pre-mixer 461.

In the example system 410, solid cellulose ether material is contemplated as being stored in the supply 460. In other systems, however, a liquid supply may be used. In example systems that use liquid, the transfer device 464 can be a pump, metering pump, valve, and other related elements suitable for carrying and metering liquids. Suitable devices such as metering pumps are well known in the art.

The cellulose ether material is combined prior to addition to the mixer 412 with at least a portion of the water being supplied from the supply 422. In the system 410, a water bypass 466 communicates with the pre-mixer 461. The bypass 466 is smaller that the supply 426. A bypass metering device 468 may be provided, with examples including valves (note that the valve 468 illustrated might be located elsewhere along bypass 466, and that additional valves might be provided on supply 426 to better restrict flow through the bypass 466), metering pumps and the like, to control the quantity of water diverted through the bypass 466 or a metering pump may be used in place of valve 468.

The example system 410 further includes a heat exchanger 470 downstream from the bypass valve 468 for heating the bypass water stream prior to combination with the cellulose ether material at pre-mixer 461. The heat exchanger 470 can be configured to heat the bypass stream to a temperature suitably high to ensure that the cellulose ether remains in solid form and does not dissolve. This temperature will depend on the particular cellulose ether material being used.

In many applications, however, a temperature of at least about 150° F. (66° C.) is believed to be useful. In other example systems, heat exchangers can be provided to heat the water to temperatures of at least about 160° F. (71° C.), at least about 180° F. (82° C.) or at least about 200° F. (93° C.). Particular temperature will vary with application parameters, which may be, for example, the slurry temperature (often in the range of about 120° F. (49° C.)), the particular cellulose ether material used (and its solubility characteristics such as temperature at which it gels), and the like.

The ratio of the water provided through the bypass 466 to the cellulose ether material provided through the supply 462 will also vary with application and design parameters. Generally, because one purpose of the bypass water stream is to disperse the solid cellulose ether in solid form, an excess of the bypass water supply may be provided. The excess should not be so great, however, that excessive drying energy will be required downstream to remove it.

Differing amounts of cellulose ether material may likewise be useful depending on factors such as slurry water content, additives present, properties of the dry gypsum present, the MW, chain length and DS of the cellulose ether, and the like. In many applications, it is believed that a range of about 0.3-2 lbs. (0.4-0.9 kg) cellulose ether per 99.7 to 98 lbs. (45.2-44.5 kg) of dry stucco solids is useful.

The weight ratio of the cellulose ether in the bypass water stream may be set as desired. In many gypsum wallboard applications, a range of between about 5% to about 50% is believed to be useful, on a weight ratio of cellulose ether to water. Excess water through the bypass 466 is beneficial for pumping and transfer of the cellulose ether suspension, but also tends to increase kiln loading and decrease final board properties. Further, it is desirable to maintain a heat balance on the slurry in the mixer 412 so the deposited slurry 454 when sandwiched between the two sheets of facing material downstream of the station exiting the forming plate is at a temperature of no more than about 120° F. (49° C.). To ensure this, it may be desirable in some applications to maintain the slurry temperature in the mixer 410 at about 120° F. (49° C.) or less.

In order to maintain a desired heat balance, it may be desirable to provide heat exchangers such as a chiller (not illustrated) on the supply 426 (perhaps downstream of the bypass 466) to chill water supplied to the slurry to balance the added heat from the heat exchanger 470. This may be particularly useful in plants operating in high ambient temperatures where the water from supply 466 is provided (without chilling) at a temperature of greater than about 70° F. (21° C.) or so. In some applications, for example, it may be desirable to chill water from the supply 466 to a temperature of about 65° F. (18° C.).

The cellulose ether material and the heated bypass water stream are combined in the pre-mixer 461. If the cellulose ether material stored in supply 460 is in liquid form, the pre-mixer 461 may include a static mixer. If the cellulose ether material is in solid form, pre-mixer 461 may include an appropriate structure for mixing a solid and liquid, such as baffles or plates to encourage mixing. Agitation may also be provided, although sufficient fluid velocity may be sufficient to encourage efficient mixing without an agitator.

One suitable set of steps for mixing a solid cellulose ether material with the water from the bypass is through use of an eductor. Those knowledgeable in the art will appreciate that an eductor includes a straight liquid flow through a venture style system which results in a partial vacuum pulling on the solid cellulose ether supply line 462 sufficient to draw the powder into the high velocity liquid stream.

A second suitable set of steps is to use a small volume tank (not illustrated) with a top mounted agitator and bottom center outlet. The tank may have baffles and runs continuously with the liquid level above the level of the baffles. Above the baffles, a vortex is formed in the fluid which draws down the powder added to the surface. Once the vortex and powders reach the level of the top of the baffles, the vortex energy is dispersed into mixing energy which then mixes the powder with the liquid. Inputs to the mixing tank would include the hot water supply to a constant tank level and the cellulose ether powder which is metered from a weight loss feeder or other accurate device. A constant flow of liquid may be pumped out of the tank and metering is accomplished by the rate of feed of the cellulose ether powder into the mixing tank.

Downstream of the pre-mixer 461 the combined cellulose ether and water stream is a substantially homogeneous suspension. At least a portion of the cellulose ether material is suspended in solid form in the water downstream of the pre-mixer 461. In some example systems, all of the cellulose ether is in solid form. The solid cellulose ether may be in the form of a fine, substantially evenly dispersed particulate in the stream downstream of the pre-mixer 461.

This combined cellulose ether and heated water bypass stream is then introduced to the slurry mixing chamber 414 through some or all of the nozzles 424. To ensure that all or at least a portion of the cellulose ether remains in solid form, it may be desirable to heat, or at least insulate, the pre-mixer 461 and/or the conduit or piping between the pre-mixer 461 and nozzles 424. In the example system 410, two of the six nozzles 424 have been illustrated as delivering the combined cellulose ether and the water stream. Other numbers of nozzles 424 may be used in other systems and methods of the invention. The particular number of nozzles 424 to use will depend on application parameters including the quantity of cellulose ether material being added, the quantity of water being added, the temperature of the water, the velocity of the stream, the quantity of the stream delivered through each individual nozzle 424, and the like.

The nozzles 424 used to introduce the combined cellulose ether and water stream can be, but are not necessarily, heated to maintain temperature. Also, it may be desirable to minimize the pressure drop across the nozzles so the resulting temperature drop does not cause the cellulose ether to gel on the nozzles. An orifice size of about ⅛" (3.175 mm) is believed to be a useful minimum size for many applications, and may be as large as ½" (12.7 mm) depending on the flow rate, line speed of the machine, etc. Materials of construction can be selected for reasons of cost and durability, with examples including brass or stainless steel. For continuous spray operation, it may be desirable to provide a duplicate system of one or more nozzles 424 so that if one nozzle 424 plugs (typically measured by increased pressure in the feed manifold) flow is switched to an unused duplicate to allow for the plugged nozzle to be flushed and cleaned.

While a greater number of nozzles 424 can be useful to achieve wider dispersion of the cellulose ether material in the mixing chamber 414, use of additional nozzles 424 may also require additional energy to heat the bypass stream feeding each additional nozzle. A balance should be achieved between a useful dispersion of cellulose ether in the mixing chamber 414 and required energy. In some example systems, all of the nozzles 424 may be used. In others, with the system 410 being an example, only a portion that is no more than about half are used. This ratio is believed to achieve a useful balance of dispersion to energy consumption in many applications.

A controller 474 is also provided that is linked at least to the cellulose ether material transfer and metering device 464, to the bypass valve 468, and to the heat exchanger 470. Other devices may likewise be connected to the controller 474, with an example being the slurry mixer 412. The controller 474 may be, for example, a computer such as a desktop or laptop PC, a server, a networked computer device, handheld processor based device, dedicated processor based controller, or other processor based device. Although only one controller 474 is illustrated in FIG. 5A, other numbers may be provided. The controller has been illustrated as a stand alone computer for clarity only—it may be integral with another device, such as a pump, valve, auger, sensor, heat exchanger, or the like. The controller 474 may include a memory with one or more software programs stored thereon for operating each of the cellulose ether transfer and metering device 464, bypass valve 468, heat exchanger 470, and other devices. The controller 474 may further include a user interface for user control, and may be linked to a network (not illustrated) or to other computers (not illustrated) for remote control and other remote interactive capabilities.

The controller 474 can be configured (through storage and execution of a computer program code, for example) to operate the bypass valve 468 to control the flow rate of water through the bypass stream, to operate the heat exchanger 470 to control the bypass stream temperature, and the cellulose ether material supply transfer device 464 to control the amount of cellulose ether combined with the bypass stream.

An additional sensor 476 such as a thermocouple can be placed at the exit or in a location downstream of the pre-mixer 461 and linked to the controller 474. The controller 474 can use temperature data from the sensor 476 to tune the operation of the heat exchanger 470, bypass valve 468, and/or cellulose ether transfer device 464. Manipulation of one or more of these devices can be performed to maintain a desired temperature of the combined water bypass and cellulose ether stream. The heat exchanger 470 can also include an internal sensor such as a thermocouple linked to the controller 474.

This configuration can be useful to ensure, for example, that the combined cellulose ether and water stream when delivered to the mixing chamber 414 is at least about 150° F. (66° C.), at least about 160° F. (71° C.), at least about 180° F. (82° C.), or at least about 200° F. (93° C.). Such configuration thereby ensures that at least some, and in other instances substantially all, of the cellulose ether material is in solid form when delivered into the mixing chamber 414. In many applications this provides for easier dispersion and mixing in the slurry as compared to introducing a cellulose ether solid into the slurry, or as a gel or viscous solution.

Following delivery to the mixing chamber 414, the dispersed solid cellulose ether material is well dispersed in the slurry. In some applications, the cellulose ether remains solid until after the slurry has exited the mixer 412. In other applications, some solubilization of the cellulose ether begins in the mixer 412. This will depend, to some extent, on the temperature of the slurry in the mixer 412. The slurry in most if not all applications is at a temperature lower than about 150° F. (66° C.). It is believed that even in applications where the cellulose ether begins to dissolve in the mixer 412, important benefits are gained by having the material (or at least a portion thereof) introduced to the slurry as a solid for ease of dispersion and mixing and subsequently dissolved. This is believed to not only benefit mixing of the cellulose ether material into the slurry, but to likewise delay the thickening effect that the cellulose ether material may have on the slurry. This delay can be useful to allow the slurry to become well mixed during its short residence time in the mixer 412.

Figure 5B:
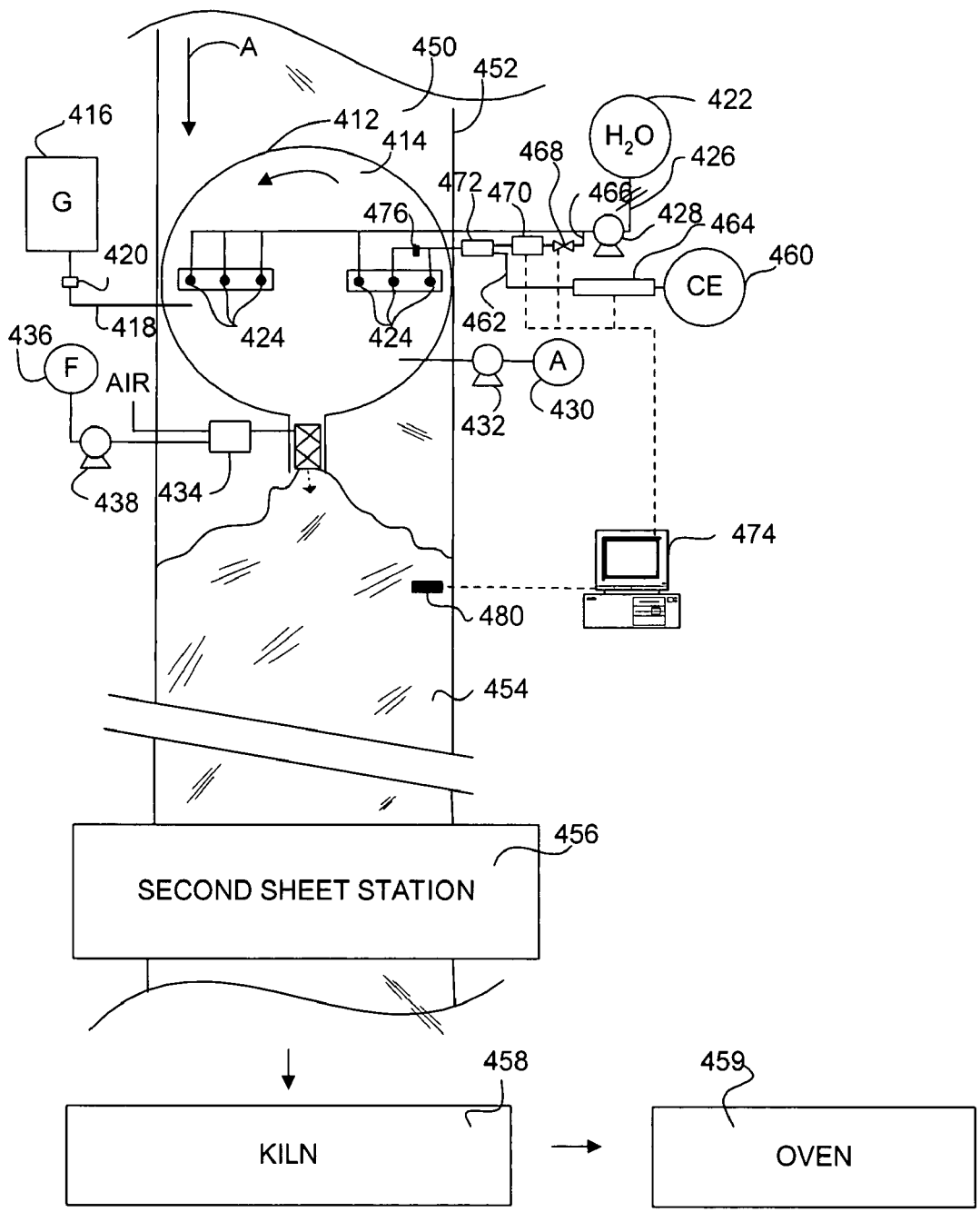

FIG. 5B illustrates an alternative configuration of the system 410. This FIG. illustrates the system 410 with an additional element—an additional sensor 480 linked to the controller 474 and positioned downstream of the mixer 412. This alternate configuration is believed to be useful to address additional needs and problems in some applications that are related to cellulose ether addition in an environment of changing process conditions.

Numerous process variables in some real-world gypsum board manufacturing processes can present a constantly changing process environment. Changing process variables can include ambient temperature, atmospheric pressure, foam content, slurry water temperature, and ambient humidity, for example. These can affect slurry viscosity and other physical properties. Compatibility issues may arise between the cellulose ether and one or more of the numerous different additives that can be added to the gypsum slurry in differing amounts. Some compatibility issues may affect slurry viscosity.

Because of these changing variables there is some chance that a given quantity of cellulose ether added to the slurry may be acceptable at some times but not at others. For example, addition of a particular quantity at a first time may result in no discernable slurry viscosity increases, but the same quantity at a second later time after some process variables have changed may lead to an undesirable viscosity increase. The present invention contemplates methods and systems for addressing these and related problems, including through use of one or more sensors 480.

The sensor 480 is configured to measure one or more physical properties of the deposited slurry 454. For example, the sensor 480 may measure temperature, viscosity, foam content, pH, or other property. A wide variety of sensors 480 may be used with systems of the invention. Examples include a thermocouple, infrared temperature detector, pH detector, and an on-line viscometer. In some invention embodiments the sensor 480 is configured to provide substantially continuous measurement data, while in other example embodiments measurement data may be provided on an intermittent basis (e.g., every 30 sec., every min., or every 90 sec).

In many invention embodiments, the sensor 480 is configured to measure the pH, temperature, or foam content of the deposited slurry 454. It has been discovered that these properties provide useful data for basing a determination of the amount of cellulose ether to add to the slurry. By way of example, slurry temperature may be indicative of the state of the cellulose ether—above a particular temperature (with an example being about 150° F. (66° C.) for some cellulose ethers) it may be likely to be in solid form (not dissolved), while below this temperature it may be likely to have been dissolved or to have formed a gel. Accordingly, in some example systems of the invention, a series of sensors 480 in the form of thermocouples may be provided in series along the conveyor 452 to identify a "zone" in which gelling is taking place.

The controller 474 may include a memory with one or more software programs for operating the sensor 480 and for processing data from a sensor, with examples being temperature data. The controller 474 as illustrated in FIG. 5B is additionally configured to respond to changes in one or more measured physical properties of the deposited slurry 454 taken by sensor 480 by altering cellulose ether addition to the slurry mixer 412. In this manner, the example system 410 as illustrated in FIG. 5B can provide beneficial real-time feedback and control of the addition and temperature of cellulose ether material, and can dynamically respond to changing properties of the slurry 454.

For example, the controller 474 can respond to a measured deposited slurry 454 property such as viscosity that exceeds a maximum limit by operating the cellulose ether transfer device 464 to deliver less cellulose ether material to the slurry mixer 412. Likewise, if the sensor 480 indicates that the slurry 454 property is below an allowable maximum, the controller 474 can respond by operating the transfer device 464 to cause an increased quantity of cellulose ether material to be delivered to the mixer 412.

The controller 474 can take different actions as well. It can respond to the sensor 480 measuring a slurry viscosity that exceeds a maximum limit by operating the heat exchanger 470 (e.g., increase temperature) or bypass valve 468 (e.g., decrease bypass volumetric flow) to cause an increase in the temperature of the combined cellulose ether and bypass water stream. Those knowledgeable in the art will appreciate that many other actions may be taken by the controller 474 to control the thickening effects of the cellulose ether material added to the slurry mixer 412.

The controller 474 may utilize a proportional-integral-derivative (PID) loop control logic or the like to control one or more of the cellulose ether transfer device 464, the bypass valve 468, or the heat exchanger 470 to maintain the addition of cellulose ether to result in the deposited slurry 454 viscosity being at a set point or within a desired range:

$$\text{Viscosity}_{MIN} \leq \text{Viscosity}_{slurry} \leq \text{Viscosity}_{MAX}$$

It will be appreciated that although a sensor 480 may not directly measure viscosity, viscosity can be estimated through a property that the sensor 480 does measure and that is related to or that can be used to determine or estimate viscosity.

By way of example, as discussed above the slurry temperature may be generally proportional to viscosity. A correlation between the two may be determined, which correlation can be stored and used by the controller 474. The controller 474 may additionally build a history in a memory of past supply of cellulose ether material, bypass water quantity and temperature, and other parameters and resulting measured properties of the slurry 454. This history can be used to tune the PID control equation (e.g., adjust gain), and/or to otherwise build predictive models to achieve more efficient controller 474 operation of one or more of the cellulose ether transfer device 464, the bypass valve 468, or the heat exchanger 470 over time.

As the cellulose ether material cools in the slurry, it is dissolved or otherwise forms a gel with excess water present in the slurry. In some applications, this may occur while the slurry 454 is downstream from the mixer 412 and after deposit on the conveyor 452. In other applications, this may occur, at least to some extent, while the slurry is in the mixer 412. The formation of the cellulose ether gel may desirably occur upstream of the station 456 where a top sheet is applied over the deposited slurry 454 since excess water has been to a large extent removed by drying by the time it reaches this point. Some systems and methods of the invention may include a sensor 480 such as a thermocouple proximate to the station 456 to confirm that gelling has already taken place by the time the deposited slurry 454 reaches this point. In other instances, it may be desirable for the gelling to mainly occur downstream of second sheet station 456 so as to minimize viscosity increases prior to full width spreading of the gypsum slurry.

Example System and Method

High Temperature Addition (Wallboard)

As discussed above, addition of cellulose ether to the gypsum slurry has been discovered to provide useful benefits and advantages to the final wallboard product including increased flexural board strength. One potential problem associated with the addition of cellulose ether is its thickening effect on the slurry. As shown in the flowchart of FIG. 1, the present invention contemplates combining the cellulose ether with at least a second material to address these effects (Block 4). The example system 410 and methods for using it shown and discussed above are one example of the present invention that are believed to significantly reduce or overcome this and related difficulties. That example system and methods perform steps of combining cellulose ether materials with water at a high enough temperature to prevent the cellulose ether from dissolving (with one example being at least about 150° F. (66° C.)) prior to addition to the gypsum slurry. As detailed above, many other system and method embodiments are contemplated.

Figure 6:
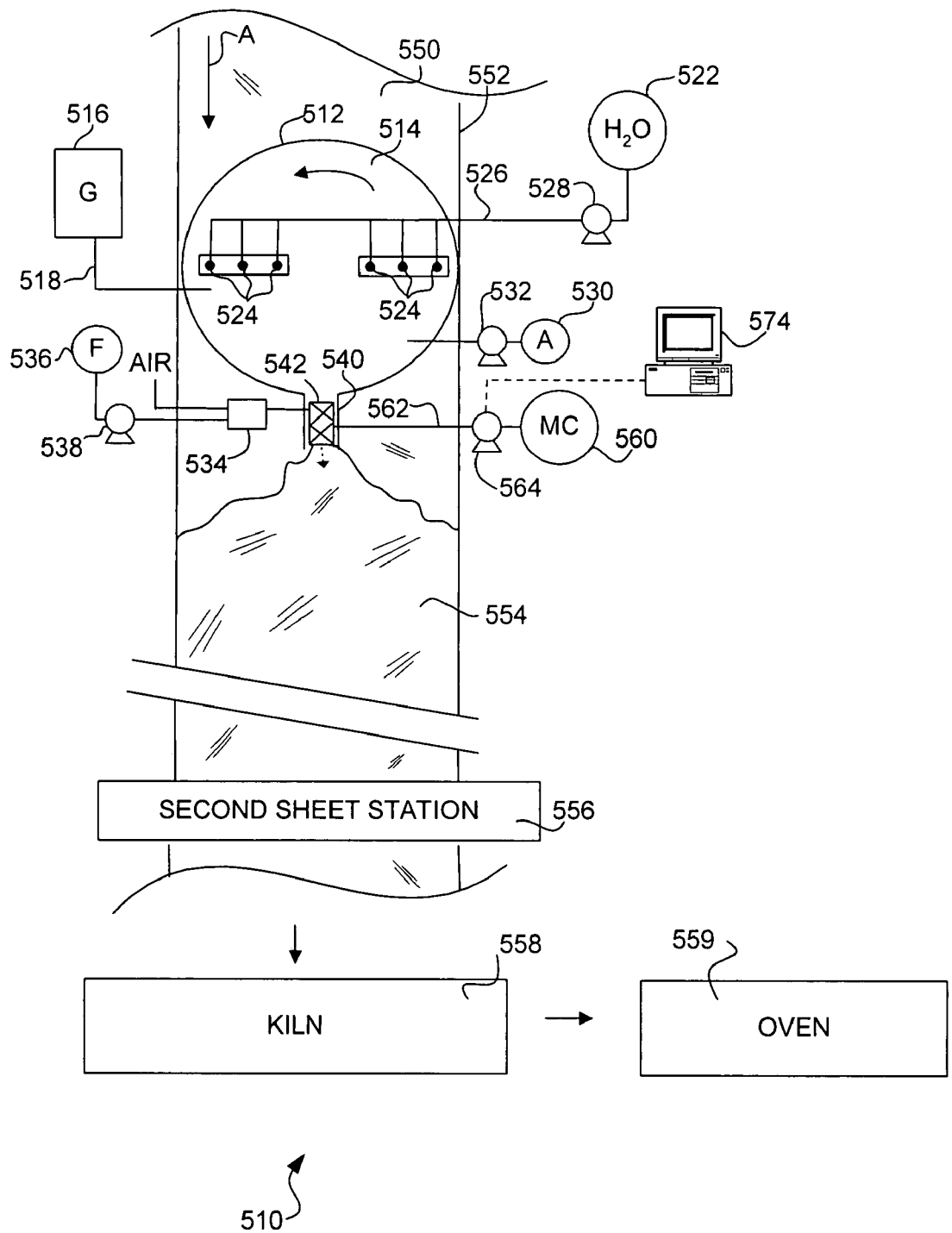
FIG. 6 is a schematic useful to illustrate additional methods and systems of the invention directed to use of high temperature water with wallboard applications.

The example system 510 schematically shown in FIG. 6 is an additional system (and is useful to illustrate an additional method) of the invention that is similar in many respects to the system 410 of FIGS. 5A-B (and methods for using those systems). Like element numbers in the 500 series have been used to identify elements of the system 510 that correspond to elements discussed above with regard to system 410. Description of these like elements is not provided herein for the sake of brevity. Description may be had through the above discussion with regard to system 410 (and/or of systems 10, 110 or 210).

Some elements of the example system 510, however, are different from corresponding elements of the example system 410 and will be discussed herein. Unlike the system 410, the example system 510 is configured to deliver the cellulose ether material at a location downstream from the mixing chamber 514. In particular, the cellulose ether supply 560 communicates via a cellulose ether supply line 562 to the mixer discharge conduit 540.

The configuration of the example system 510 of FIG. 6 and steps of using it may provide advantages and benefits over the system 410 of FIG. 5A-B in some (but not necessarily all) applications. Introduction of the cellulose ether to the slurry mixing chamber 514 can increase viscosity of the slurry therein. In some applications, depending on factors such as the type of dry calcined gypsum being used, additives being used, the cellulose ether being delivered to the mixing chamber 514, and others, the quantity and viscosity of the slurry in the chamber 514 can reach a level that causes difficulty in effective mixing or unwanted horsepower requirements. In circumstances such as this, introducing the cellulose ether downstream from the mixing chamber 514 in the discharge conduit 540 allows for the slurry to be effectively mixed prior to addition of the thickening cellulose ether.

Some cellulose ethers may also function as a surfactant, and in some circumstances have the potential to undesirably interact with the foam. There is the potential, for example, that the cellulose ether may undesirably limit the quantity, distribution and/or size of gaseous bubbles in the slurry. It is believed, however, that introducing cellulose ether material at a location in the discharge 540 downstream from the location where the foam is introduced avoids, or at least minimizes, these undesirable effects. Introduction of the cellulose ether material downstream from the foam is believed to allow for the foam bubbles to have substantially formed and to have been distributed in the slurry.

Accordingly, in the example system 510 the cellulose ether material is delivered by the supply line 562 to the slurry at a location downstream from where the foam is introduced to the discharge conduit 540. This downstream location may be within the static mixer 542 that mixes the foam with the slurry. Alternatively, the supply line 562 may feed a second static mixer downstream from the first that mixes one stream containing foam and slurry (which was combined by the first static mixer) with the cellulose ether stream. In this example configuration, the static mixer illustrated as element 542 in FIG. 6 may be considered to be two adjacent mixers arranged in series.

In addition to use of one or more static mixers 542, the cellulose ether material may be effectively mixed into the slurry in the discharge conduit 540 through use of other devices and/or steps. For example, an additional one or more nozzles (such as nozzles 524) can be positioned in the discharge conduit 542 or immediately adjacent to the exit to distribute the cellulose ether material in the slurry. Other mixing methods are likewise contemplated and will be apparent to those knowledgeable in the art.

The system 510 further differs from the system 410 in that no water supply is combined with the cellulose ether material from supply 560 prior to introduction to the slurry mixer 512. The system 510 contemplates that cellulose ether solution is stored in liquid form in the supply 560 at a high enough temperature to prevent it from dissolving. Although the particular temperature will depend on the cellulose ether material being used, approximate temperatures useful for some materials include about 150° F. (66° C.), about 160° F. (71° C.), about 180° F. (82° C.), or at least about 200° F. (93° C.). The supply 560 may be provided with a heated jacket or other heated means for accomplishing this. In still other example systems and methods, the supply 560 may contain an emulsion that uses a surfactant to maintain cellulose ether in discrete solid form in a water continuous phase.

Because gelling of the cellulose ether material is desired to occur in the slurry 554 once deposited on the conveyor 552, the temperature of the supply 560 may be maintained above, but relatively close, to the threshold temperature. This would be likely to promote gelling relatively quickly after introduction to the slurry 554.

The system 510 may entail additional energy requirements over the system 410 due to the requirement of maintaining the supply 560 at elevated temperature. To reduce this, the supply 560 may be of small size and be continuously (or semi-continuously) supplied with water and cellulose ether. In this manner, the supply 560 may be considered a mixing chamber similar to the mixing chamber 472 of FIGS. 5A-B. Further, the system 510 might be configured similar to that of the system 410, with solid cellulose ether stored in the supply 560 and a high temperature water supply provided to be combined with the cellulose ether close to its introduction location in discharge 540.

Example System and Method

High Temperature Addition (Wallboard)

Figure 7:
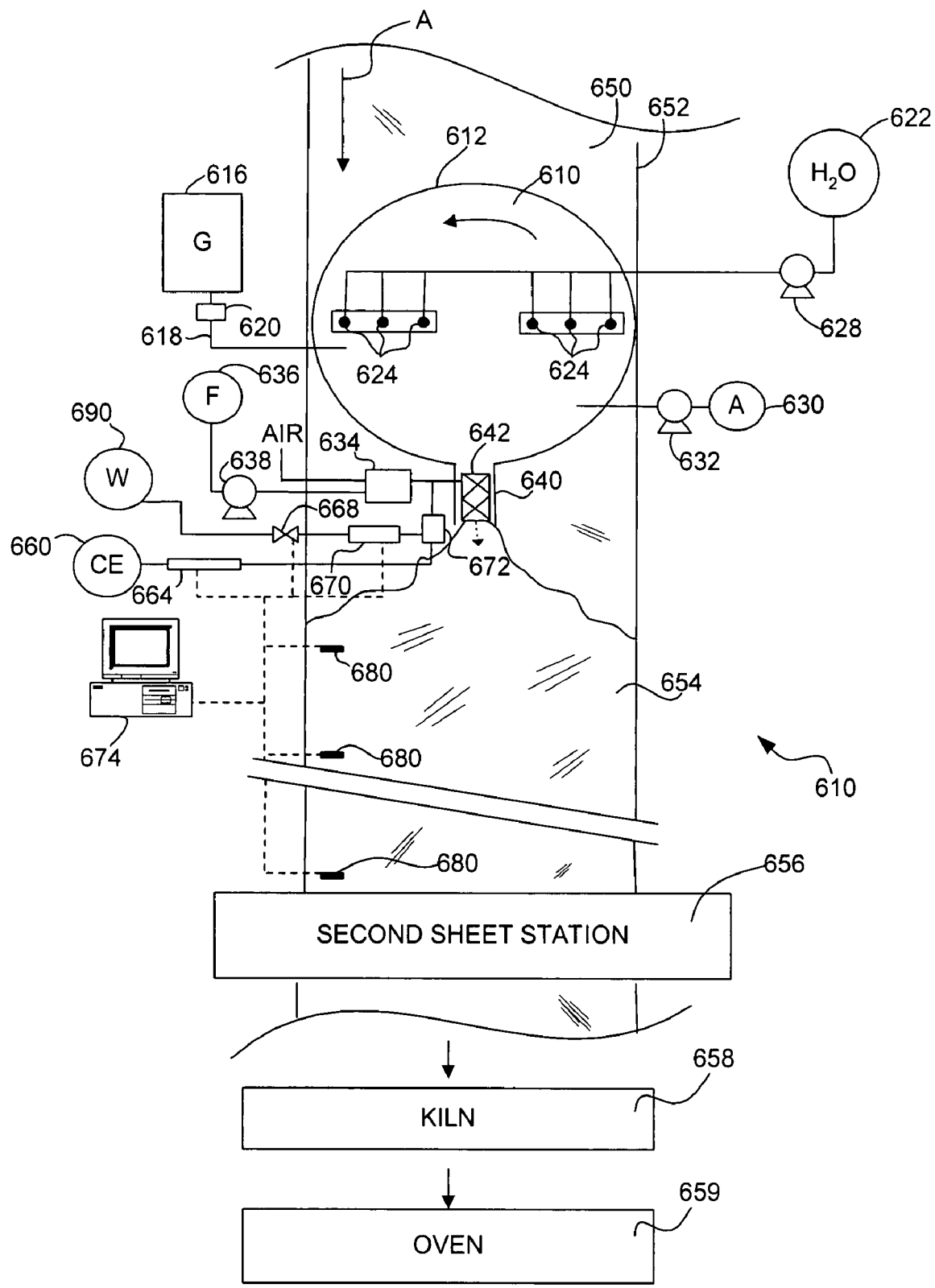
FIG. 7 is a schematic useful to illustrate additional methods and systems of the invention directed to use of high temperature water with wallboard applications.

An additional example system 610 of the invention, which is useful to illustrate an additional method of the invention, is schematically illustrated in FIG. 7 and is consistent in many respects with the example systems 410 and 510 illustrated in FIGS. 5A-B and 6. Like those systems and methods for using them, the system 610 and steps of using it are useful to introduce cellulose ether in combination with high temperature water that is configured to delay the solubilization of the cellulose ether. For purposes of clarity, like element numbers have been used in the 600 series to refer to elements of the system 610 that are consistent with elements of the systems 410 and 510. For sake of brevity, description of like elements of the system 610 is not provided herein, with description instead available through the above discussion of systems 410 and/or 510. The system 610 is different in some respects, however, from the systems 410 and/or 510, and these different aspects will be discussed herein below.

The example system 610 is configured to combine the solid cellulose ether material from the cellulose ether supply 660 with high temperature water from supply 690, and then deliver this combined stream together with the foam from supply 636 to the slurry. The combined foam and cellulose ether material is delivered to the slurry at the mixer discharge conduit 640, and in particular via the static mixer 642. The cellulose ether material supply line communicates with the foam supply downstream from the foam mixing chamber 634. As discussed above, this is believed to be useful in many applications to allow the foam to first form before combination with the cellulose ether material which may function as a surfactant and otherwise interfere with foam formation. However, when delivering the cellulose ether material together in a stream of high temperature water, these effects on the foam should be minimized since the cellulose ether material should remain in solid form.

A heat exchanger 670 is provided on the water supply line 692 from water supply 690 to heat the water to a desired temperature. This exchanger can be operated by the controller 674 to provide water at a suitably high temperature to ensure that the solid cellulose ether material from supply 660 remains a solid in the combined stream. The controller is also linked to the cellulose ether transfer device 664 and to the water supply metering valve 668 for controlling the quantity and temperature of the cellulose ether material supplied to the slurry. A mixing chamber 672 is provided for mixing the cellulose ether material from supply 660 with the heated water from supply 690 before combination with the foam.

The controller 674 is also shown as linked to a plurality of sensors 680 arranged in sequence along the length of the conveyor 652, with one of the sensors just upstream of the station 656 wherein the top wallboard facing sheet is applied. This may be useful, as discussed above, to measure one or more properties of the slurry 654 as it progresses along the conveyor and to indicate at what location along the conveyor gelling of the cellulose ether is likely occurring in the slurry 654. The sensors 680 may measure, for instance, slurry 654 temperature.

The controller 674 can take actions in response to data from the sensors 680. For example, if the sensors 680 indicate that temperature of the slurry at one or more locations was increasing and nearing the threshold temperature at which the cellulose ether would no longer gel or dissolve, it could lower the temperature of the exchanger 670 and/or lower the quantity of water from supply 690 and/or cellulose ether from supply 660 that was provided. In this manner the system 610 and its controller 674 can provide dynamic feedback and control of cellulose ether addition.

As noted above with reference to controllers in other embodiments of the invention, the controller 674 has been illustrated as a stand alone computer for convenience only. It will be understood that the controller 674 may be functionally combined with other devices of the invention, with an example being a sensor, pump, transfer device, metering device, heat exchanger, or the like. Those knowledgeable in the art will appreciate that many of these devices are available with relatively advanced data processing and control capabilities and may be used to perform the functions of the stand-alone controller 674.

Example Method and System

Cross Linkers/Emulsions (Wallboard)

Referring once again to the flowchart of FIG. 1, some example systems and methods of the invention contemplate performing the step of Block 4 by combining the cellulose ether with one or more cross-linkers. Cross linkers may be thought of as materials that are useful to link polymer chains together. They can be compounds that link the chains together through formation of covalent bonds with the chains. Cross linkers are thereby useful to functionally form longer chain polymers using shorter chains.

The use of cross linkers in systems and methods of the present invention is believed to provide several advantages and benefits in some applications. With reference to Block 4 of FIG. 1 and corresponding discussion above, some potential advantages of use of cross linkers are related to delayed thickening effects in the slurry. If the interaction of the cross linker and the cellulose ether can be delayed until the slurry exits the mixer, disadvantageous thickening effects of the cellulose ether are substantially avoided. Also, and thickening effects due to the cellulose ether alone (before interaction with the cross linker) are minimized since a lower concentration and shorter chain length is required due to the presence of the cross linker.

Still other advantages and benefits are achieved through the chemical and mechanical functionality of the cross linkers. The use of a cross linker is believed to lead to relatively long chain cellulose ether groups that provide increased flexural strength in final gypsum board products when compared to the same board product that include only the shorter chain cellulose ethers.

Cross linkers can also lead to beneficial cost savings. Cellulose ethers can be relatively costly materials. Manufacture of gypsum board products tends to be a very competitive business with tight profit margins. Use of costly materials can impact profitability. The use of cross linkers is believed to reduce the amount of cellulose ether required to achieve useful benefits in increased flexural strength. For example, through some example methods and systems of the invention the use of a small amount of some cross linker together with 1% by weight of cellulose ether in a gypsum slurry is believed to achieve similar or substantially the same increase in flexural strength of the final wallboard product as would be achieved using a larger concentration of about 1.5%-2% cellulose ether by weight. Methods and systems of the invention utilizing cross linkers can thereby achieve reduced cellulose ether costs of about 33%-50% in some applications. Over a year's production these savings can be very significant.

Use of a cross linker in a gypsum slurry, however, entails some potential difficulties. For example, the cross linker may undergo side reactions with other components of the slurry, with an example being slurry additives. These side reactions can interfere with the desired functionality of the material the cross linker reacts with (e.g., an additive), and also consume cross linker and thereby render it unavailable for reaction with the cellulose ether.

Methods and systems of the invention minimize or eliminate many of these difficulties. As discussed above with reference to the system and method of the invention illustrated through the schematic of FIG. 2, some example systems and methods of the invention includes steps of forming an emulsion with cellulose ether as a dispersed phase. This is believed to provide advantages that are related to delaying the thickening effects of the cellulose ether on the gypsum slurry, as well as other advantages. The system schematically illustrated in FIG. 8 is useful to illustrate methods and systems for achieving these advantages.

Figure 8:
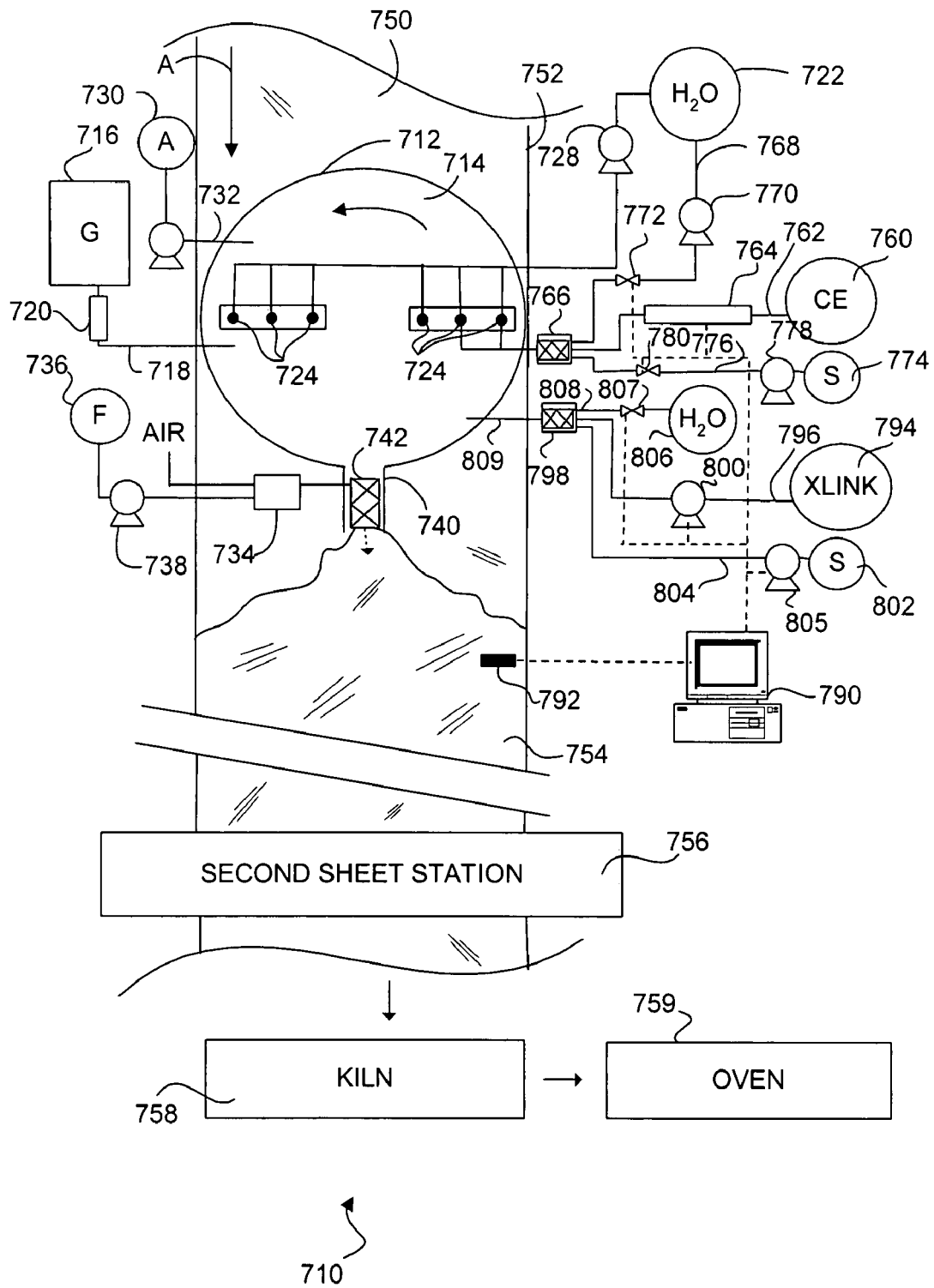
FIG. 8 is a schematic useful to illustrate additional methods and systems of the invention directed to use of cross-linkers with wallboard applications.

The system 710 of FIG. 8 is identical to the system 10 of FIG. 2 herein above, except that additional components have been provided. Like element numbers in the 700 series have been used to describe like elements. No description of these like elements is provided herein for sake of brevity; description may be had through reference to the discussion of FIG. 2 provided herein above. By way of example, the mixer 712 of FIG. 8 may be considered to be substantially identical to the mixer 12 of FIG. 8 (as well as to mixers 12,112,412, etc., of other FIGS. discussed herein above). The system 710, however, includes several additional elements not provided in the system 10 or other systems described above. Description of these elements is called for, as well as of steps for using them.

The system 710 is configured to carry out a method of adding a cross linker to the slurry. In particular, the system 710 is configured to carry out a method of adding a cross linker as the dispersed phase in an emulsion (or an inverted emulsion) to the slurry. The emulsion is configured to break and release the cross linker into the slurry only after the slurry has exited the mixer 712 and been deposited on the moving receiver 752.

This is believed to be advantageous for several reasons. For example, providing the cross linker as the dispersed phase in an emulsion that does not break until the slurry has exited the mixer 712 minimizes or eliminates the risk that the cross linker will participate in disadvantageous side reactions before the slurry has been well mixed in the mixer. Also, the thickening effects of the long chain cellulose ethers created through reaction of the cellulose ether with the cross linker will likewise be delayed until after the slurry has been well mixed in the mixer.

Turning now to the particular configuration of the system 710 and the steps of adding a cross linker to the slurry, a suitable cross linker is stored in a supply 794. A variety of cross linkers will be suitable for use in methods and systems of the invention. Generally, cross linkers useful in methods and systems of the invention include those that are rich in electron density at the cross linking points, such as aldehydes, ketones, carboxylic acids, nitrogen compounds, boric acid, ammonium phosphates, phenol-formaldehydes, urea-formaldehyde, melamine formaldehyde, diisocyanate, and the like. The supply 794 communicates via a conduit 796 with an emulsion mixer 798, which may be, for example, a static mixer or other high shear mixer. A metering pump 800 or other transfer and measuring device is provided to deliver the cross linker in a desired quantity.

The emulsion mixer 798 also communicates with a surfactant supply 802. Any of multiple suitable surfactants may be used in methods and systems of the invention, with examples including anionic and cationic surfactants. Selection of a particular surfactant may be made based on factors such as the particular cross linker used, the particular cellulose ether used, the slurry additives, and other like factors.

The surfactant supply 802 communicates with the emulsion mixer via conduit 804, which may be a pipe or the like. A metering pump 805 is provided to deliver the surfactant in a desired quantity. Water is also supplied to the emulsion mixer 798 from supply 806, which may be a common tap supply or may be common with the supply 22. A valve 807 is provided along the conduit 808 to control the quantity of water supplied to the emulsion mixer 798.

In practice, desired quantities of the surfactant from supply 802, the cross linker from supply 794, and water from the supply 807 are mixed together under high shear in the emulsion mixer 798 to form an emulsion with the cross linker as a dispersed phase. The particular concentrations of the surfactant, cross linker and water mixed to form the emulsion will vary depending on the particular materials used, the particular cellulose ether used, and like factors. These ranges will be apparent to those knowledgeable in the art. As an example, the cross linker may be provided in a concentration range of about 0.05-0.5% (wt.). The present invention also contemplates formation of an inverted emulsion with the cross linker as the dispersed phase. As noted herein above, the term emulsion as used herein is intended to include inverted emulsions.

After formation, the emulsion is delivered via conduit 809 to the mixing chamber 714. In addition to the configuration shown in FIG. 8, the conduit 809 may communicate with one or more of the nozzles 724 for delivery of the cross linking emulsion. In some embodiments, it may be desirable to deliver the cross linker emulsion through the same nozzles 724 or nozzles 724 that are adjacent to the nozzles 724 that are used to deliver the cellulose ether emulsion. Doing so may be useful, for example, to increase the chances that the cross linker will be in relatively close proximity to the cellulose ether. In still additional systems and methods of the invention, the cross linker emulsion is delivered to the mixer 712 downstream from the location where the foam is introduced (e.g., at the discharge conduit 740).

The cross linker emulsion is configured to break after the slurry has exited the mixer 712. As discussed above, the term "break" when used in this context is intended to be broadly interpreted. The emulsion "breaks" after a threshold amount of free water has been removed (through drying and/or absorption and/or chemical reaction) from the slurry. At this point the dispersed phase cross linker is released into the slurry (which may now be in the form of a setting gypsum matrix) for reacting with the cellulose ether. In the case of an inverted emulsion containing the cross linker as the dispersed phase, after a threshold amount of water has been removed through absorption, chemical reaction and/or drying, the inverted emulsion breaks (phases reverse) to release the cross linker into the slurry (which may be in the form of a interlocking gypsum matrix).

Configuration of the emulsion/inverted emulsion to achieve breakage at a desired location or time along the manufacturing process may be achieved (at least to some extent) through selection of cross linker, surfactant, cross linker and surfactant concentration. Preferably the emulsion remains as an emulsion while the slurry is resident in the mixing chamber 714, and breaks only after the slurry 754 has exited the mixer 712 and been deposited on the wallboard sheet 750 being carried on the conveyor 752. At this point the dry calcined gypsum continues to take free water from the slurry 754 causing the surface tension in the slurry to change. Excess water is also lost through drying. At some point, the surface tension crosses a threshold where the emulsion breaks and the dispersed phase cross linker is released into the slurry 754. In the case of methods and systems of the invention which utilize an inverted emulsion, the changing surface tension crosses a threshold whereby the phases of the inverted emulsion reverse and the cross linker is released into the slurry 754.

It may be desirable in some system and method embodiments to configure the cross linker emulsion to break at substantially the same or a close time or location as the cellulose ether emulsion is configured to break. In this manner, both the cellulose ether and cross linker can be released for reaction with one another near simultaneously. This minimizes risks that either the cross linker or the cellulose ether will engage in disadvantageous side reactions.

Like the system 10 discussed above with regard to methyl cellulose, the system 710 and methods utilizing it also offer advantageous control over the location where the cross linker is released into the slurry. The required surface tension threshold at which the emulsion breaks (including at which an inverted emulsion reverses phases) can be controlled to a large degree by selection of surfactant. In methods and systems of the invention, different surfactants and different quantities of surfactants can be used to cause the emulsion to release the cross linker into the slurry at different locations along the wallboard or fiberboard manufacture process.

For example, a first surfactant in a first quantity may be selected to cause an inverted emulsion to reverse phases in a first surface tension range. This range may be expected to occur just after the slurry has been deposited on the wallboard facing material while the gypsum initially sets and reacts with or absorbs water to covert from its hemihydrate to its dihydrate state.

In other methods and systems of the invention, a second surfactant (or a second quantity of the first surfactant) may be selected to cause the inverted emulsion to reverse phases in a second surface tension range. This second surface tension range may be expected to exist at a different location along the board manufacture process. For example, this second surface tension range may correspond to a lower free water content than the first surface tension range, and may be expected to exist while the board dries in the kiln 758 or the oven 759.

A particular surfactant in a particular quantity may be selected, for instance, to cause the inverted emulsion to break when the water content of the slurry 754 (which may be in the form of a setting gypsum slurry) is very low—while the finished board product is drying in the kiln 758 or oven 759. As the board dries in the kiln 758, water is evaporated through the facing sheets. As discussed above in relation to the cellulose ether slurry, it is believed that as this occurs mobility of methyl cellulose released in the body of the slurry 754 is relatively high. It is believed, for example, that a significant portion of the methyl cellulose released in the bulk of the slurry 754 may be carried from the bulk to the slurry interface at the facing sheets. This is believed to offer advantages in some applications in that it may be desirable to concentrate the methyl cellulose at the facing sheet. In these applications, it may likewise be desirable to configure the cross linker emulsion to break at this location and to thereby release the cross linker for reaction with the cellulose ether.

In other applications, it may be desirable to configure the cross linker emulsion to break after the cellulose ether emulsion has broken. This may be useful, for example, to allow the cellulose ether to widely disperse in the slurry 754 before chain lengthening effects of interaction with the cross linker occur.

The controller 790 is linked at least to metering pumps 800, 805 and the valve 807 to control the quantity and quality of the cross linker emulsion prepared and delivered to the mixer 712. The controller 790 may include a memory with one or more software programs stored thereon for operating each of the pumps 800, 805, valve 807, and for operating the sensor 792 and for processing data from it, with examples being temperature data. The controller 790 may further include a user interface for user control, and may be linked to a network (not illustrated) or to other computers (not illustrated) for remote control and other remote interactive capabilities.

The controller 790 is additionally configured to respond to changes in one or more measured physical properties of the slurry 754 measured by the sensor 792 by altering the quantity or quality of the cross linker emulsion delivered to the mixer 712. In this manner, the example system 710 and methods using it can provide beneficial real-time feedback and control of the addition of cellulose ether material, and can dynamically respond to changing properties of the slurry 754. Although illustrated as being a stand-alone computer, the controller 790 may be combined or functionally included with another device.

The example system 710 and methods for using it represent only a few of the many embodiments of the present invention contemplated for preparing a gypsum slurry that contains cross linker. It will be appreciated, for example, that methods and systems for introducing an emulsion with a cross linker as the dispersed phase are not limited to systems and methods where the cellulose ether is also introduced as an emulsion. In other embodiments of the invention, an emulsion containing a cross linker as the dispersed phase may be added to the slurry where the cellulose ether has been introduced, for example, as together with high temperature water. The systems and methods illustrated by FIGS. 5A-B and 6 may achieve benefits through use of a cross linker emulsion.

Example Method and System

Cross Linker Emulsion/(Fiberboard)

Addition of cross linkers to wallboard is also believed to achieve substantially the same useful benefits and advantages as are achieved in wallboard applications. Cross linkers may be added to a gypsum slurry in a fiberboard manufacture process in much the same manner as they are in wallboard applications, with an example being through introduction of an emulsion with a dispersed phase cross linker.

Figure 9:
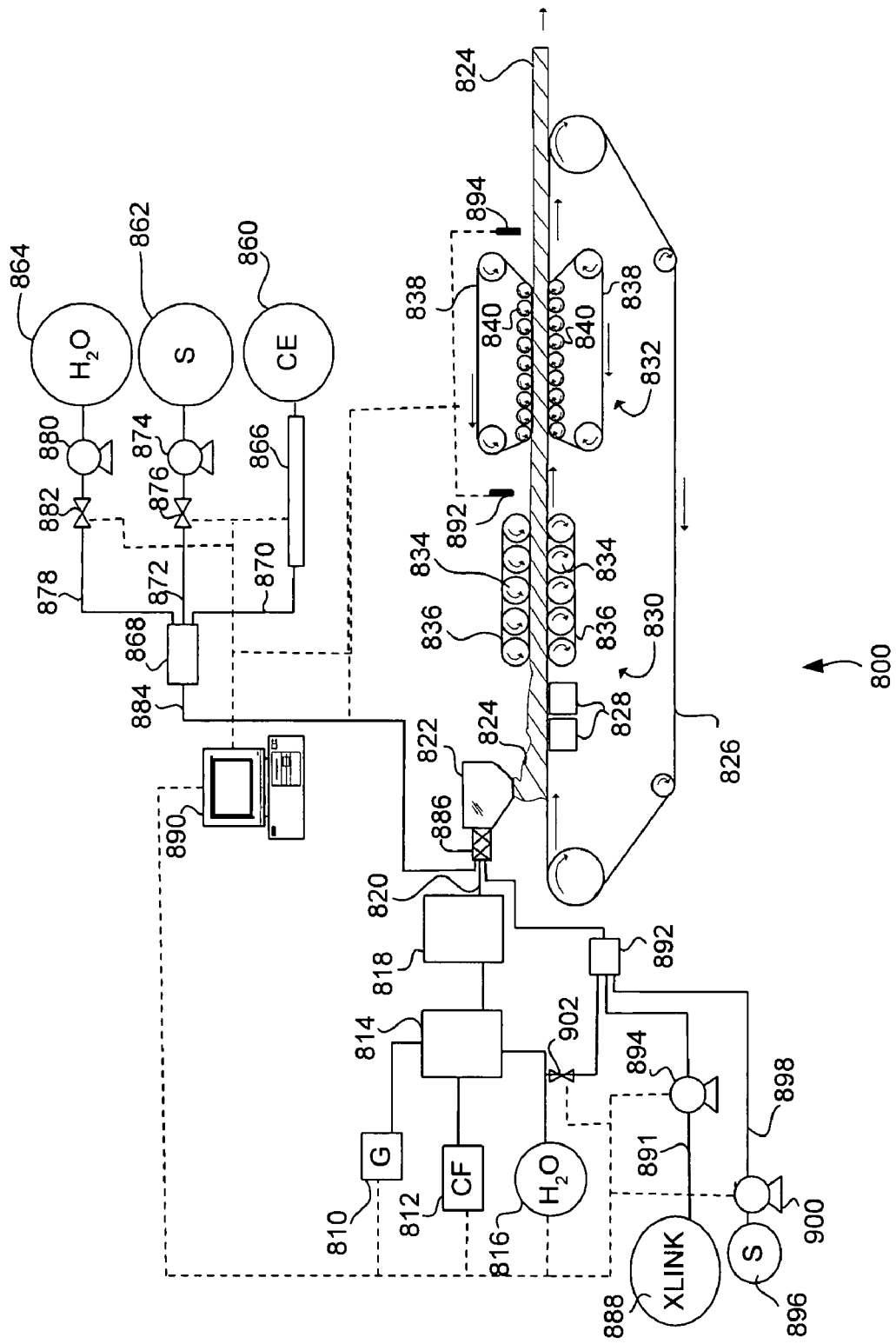
FIG. 9 is a schematic useful to illustrate additional methods and systems of the invention directed to use of cross-linkers with fiberboard applications.

FIG. 9 is useful to illustrate such systems and methods. The system 800 of FIG. 9 is identical to the system 300 of FIG. 4, except that additional elements have been provided for preparing and introducing a cross linker to the slurry as the dispersed phase in an emulsion. Like elements numbers in the 800 series have been used to describe elements that are consistent with elements of the system 300. No description of these items is provided for sake of brevity, but may be had through reference to the discussion of the system 300 herein above.

Like the system 300, the system 800 is useful for making gypsum fiberboard. Unlike the system 300, however, the system 800 is additionally configured to perform a method of adding a cross linker in the dispersed phase of an emulsion to the slurry. A suitable cross linker is stored in a supply 888. A variety of cross linkers will be suitable for use in methods and systems of the invention including those discussed above that are rich in electron density at the cross linking points (such as aldehydes, ketones, carboxylic acids, nitrogen compounds, boric acid, and ammonium phosphates). The supply 888 communicates via a conduit 891 with an emulsion mixer 892, which may be, for example, a static mixer or other high shear mixer. A metering pump 894 or other transfer and measuring device is provided to deliver the cross linker in a desired quantity.

The emulsion mixer 892 also communicates with a surfactant supply 896. Any of multiple suitable surfactants may be used in methods and systems of the invention, with examples including anionic and cationic surfactants. Selection of a particular surfactant may be made based on factors such as the particular cross linker used, the particular cellulose ether used, the slurry additives, and other like factors.

The surfactant supply 896 communicates with the emulsion mixer via conduit 898, which may be a pipe or the like. A metering pump 900 is provided to deliver the surfactant in a desired quantity. Water is also supplied to the emulsion mixer 892 from supply 816, with a valve 902 provided to control the quantity supplied to the emulsion mixer 892. Although not illustrated, a heat exchanger may be provided to control the temperature of the water supplied from the supply 816, or the supply 816 may be maintained at a desired temperature.

In practice, desired quantities of the surfactant from supply 896, the cross linker from supply 888, and water from the supply 816 are mixed together under high shear in the emulsion mixer 892 to form an emulsion with the cross linker as a dispersed phase. The particular concentrations of the surfactant, cross linker and water mixed to form the emulsion will vary depending on the particular materials used, the particular cellulose ether used, and like factors. The present invention also contemplates formation of an inverted emulsion with the cross linker as the dispersed phase. As noted above, the term emulsion as used herein is intended to include inverted emulsions.

The emulsion is delivered from the emulsion mixer 892 to the headbox 822, and in particular to the static mixer 836 at the entrance to the headbox 822. This ensures thorough dispersion in the slurry. The emulsion is configured to break after the slurry has exited the headbox 822. The point at which the emulsion breaks to release the cross linker into the slurry can be controlled at least to some extent through selection of surfactant, concentration of surfactant, and like factors. This will occur as the surface tension of the slurry crosses some threshold.

As discussed herein above with regard to the system 300 and methods for using it, it may be desirable in some applications to engineer the emulsion containing the cellulose ether to break and release the cellulose ether in the second press 832. It may likewise be advantageous to engineer the cross linker emulsion to break or downstream from the second press 832. In many applications it will be desirable to engineer the cross linker emulsion to break and release the cross linker into the slurry 824 at approximately the same time or location as the cellulose ether emulsion breaks and releases the cellulose ether into the slurry 824. This avoids or minimizes risks that the cross linker will participate in unwanted side reactions before interaction with the cellulose ether. In some cases it may be desirable to engineer the emulsion to release the cross linker earlier than the cellulose ether to allow the cross linker to be well dispersed. In some other embodiments, however, it may be desirable to engineer the cellulose ether to be released in advance of the cross linker to allow the cellulose ether some migration in advance of interaction with the cross linker.

The controller 890 is linked to the metering pumps 894 and 900, as well as the valve 902, and is configured to control the quality and quantity of the cross linker emulsion delivered to the headbox 822. The controller 890 is also connected to sensors 892 and 894 which are configured to measure a physical property of the slurry 824, with examples including temperature, pH, viscosity, and the like. The controller 890 may change the quantity or quality of the cross linker emulsion delivered to the slurry in response to changing slurry 824 properties as measured by the sensors 904 and to thereby maintain the qualities of the slurry 824 within desired bounds. As with other invention embodiments, although the controller 890 has been illustrated as a stand-alone computer it may be combined with one or more other devices.

Example Method and System

Cross Linkers/Drycoating (Wallboard)

As discussed above, the various embodiments of the present invention have in common that they combine cellulose ether with at least a second material to delay the thickening effects of the cellulose ether (see FIG. 1, Block 4). Some embodiments of the present invention include use of the cross linker as the second material. In one additional example, embodiments of the invention include systems and methods that dry coat the cellulose ether with a cross linker. The cross linker may substantially encapsulate the cellulose ether. The solid cellulose ether together with the solid cross linker coating is then introduced into the slurry. The cross linker coating is configured to dissolve in the slurry before the cellulose ether, through, for example selection of an appropriate cross linker and/or coating layer thickness. This advantageously delays solubilization of the cellulose ether. Other benefits are also believed to be achieved. For example, the cross linker is believed to remain in close physical proximity to the cellulose ether in the slurry. This minimizes the risk of either the cross linker or cellulose ether from participating in unwanted side reactions.

Figure 10:
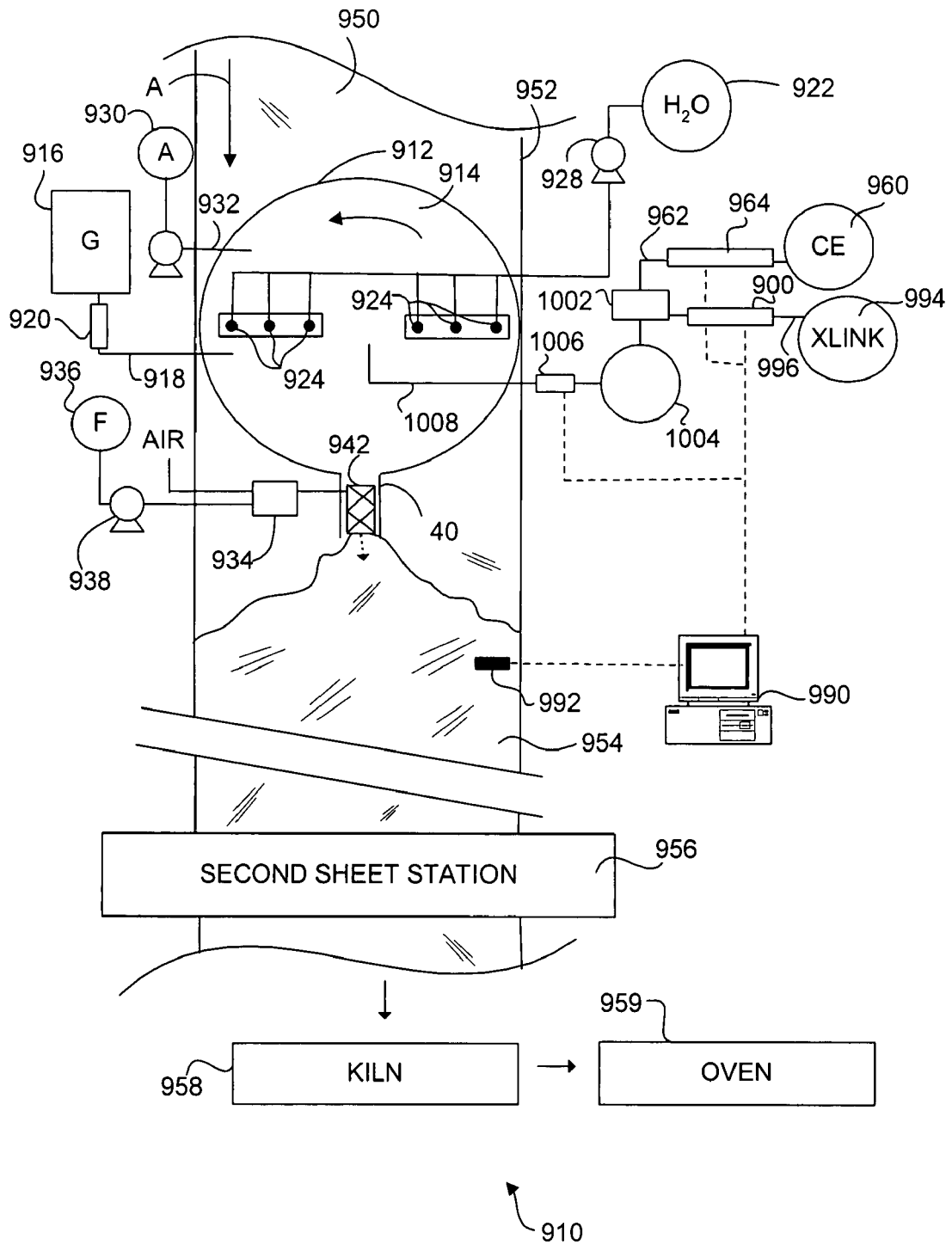
FIG. 10 is a schematic useful to illustrate additional methods and systems of the invention directed to use of cross-linkers with wallboard applications.

The system 910 of FIG. 10 is useful to illustrate such systems and methods. The system 910 is consistent in many respects with other systems that have been described herein above, including the system 710 of FIG. 9. Like element numbers have been used for clarity in the 900 series. Description of like elements has been omitted for sake of brevity and may be had through the above discussion of similar systems. Portions of the system 910, however, are different from other systems and will be discussed.

In the system 910, the cross link supply 994 is contemplated as containing a solid cross linker, although in other applications a liquid may be used. The supply 994 communicates with a conduit 996, with a transfer device 900 such as a conveyor, auger, or the like provided to urge the cross linker therethrough. A metering device such as a scale or volumetric measuring device may be included in the transfer device to control the quantity of cross linker supplied. In the case of a liquid cross linker, a metering pump may be provided.

The conduit 996 delivers the cross linker from the supply 994 to a dry spray chamber 1002. The dry spray chamber 1002 likewise communicates with the cellulose ether supply 960. The cellulose ether supply 960 contains solid cellulose ether which is urged along conduit 962 by transfer device 964, which may be, for example, an auger, conveyor or like device suitable for moving granular solids. The transfer device 964 may further include metering functionality, with an example being a scale or calibrated volumetric means useful to cause a desired quantity of solid cellulose ether from the supply 960 to be communicated along the conduit 962 and to the dry spray chamber 1002.

The dry spray chamber 1002 may be configured in any of several suitable manners for coating the solid cellulose ether from supply 960 with the cross linker from supply 994. In one example, an electrostatic charge is applied to one or more of the solid cross linker and cellulose ether to cause an attraction to one another. When the two fine powders are then brought into contact, the particles of cellulose ether adhere to particles of cellulose ether. Following dry coating in the dry coating chamber 1002, the cellulose ether particles are physically connected to the cross linker. Other chamber 1002 configurations and methods for applying a cross linker coating will be apparent to those knowledgeable in the art. In some applications (but not all), the cellulose ether may be substantially encapsulated by the cross linker.

The coated cellulose ether is transferred from the dry coating chamber 1002 to a storage container 1004. The process of dry coating the cellulose ether may be performed in a batch manner from time to time to maintain the supply in the storage container 1004 at a desired level. Also, it will be appreciated that the dry coating process may be performed off site remote from the storage container 1004, with dry coated cellulose ether delivered in batch to the storage container 1004. It has been schematically shown as being performed proximate to the storage container 1004 for purposes of illustration.

The coated cellulose ether is urged from storage container 1004 by transfer means 1006, which may be a conveyor, auger or the like, through conduit 1008 and into the mixing chamber 914. The conduit 1008 may be configured to deliver the solid dry coated cellulose ether into the mixing chamber 914 near its center, where a vortex in the slurry has developed through rotational mixing. The transfer means 1006 preferably includes metering functionality, with an example being a scale or like device useful to control the quantity of the dry coated cellulose ether delivered to the mixing chamber 914.

The cellulose ether in supply 960 may be any suitable cellulose ether, with examples including methyl cellulose and others described herein above in connection with other examples of the invention. The cross linker stored in the supply 994 may likewise be any suitable cross linker including those discussed herein above in connection with other invention embodiments. The cross linker is selected to dissolve in the slurry earlier than the cellulose ether. This may be accomplished, for example, through selection of a particular cross linker, selection of dry-spraying parameters to result in a desired layer thickness of the cross linker coating, and the like.

When the cross linker has been coated on the cellulose ether, the solubilizaton of the cellulose ether in the slurry will be delayed as the cross linker will dissolve earlier than the cellulose ether. The amount of delay will depend on factors such as the thickness of the cross linker coating layer, the particular cross linker utilized, the temperature of the slurry, and the like. These and other parameters may be varied to control the location along the gypsum board manufacture process where the cellulose ether is solubilized. Preferably this occurs after the slurry has exited the mixer 912. The slurry is well mixed at this point, and the foam has been introduced. In some applications, it may be desirable to delay this until the slurry is being dried in the oven 958 or kiln 959.

Example Method and System

Cross Linkers/Drycoating (Fiberboard)

Still other embodiments of the invention are directed to methods and systems for introducing cellulose ether dry coated with a cross linker to a gypsum slurry in a fiberboard application, as opposed to the wallboard application discussed in association with FIG. 10. The schematic of FIG. 11 is useful to illustrate these invention embodiments.

Figure 11:
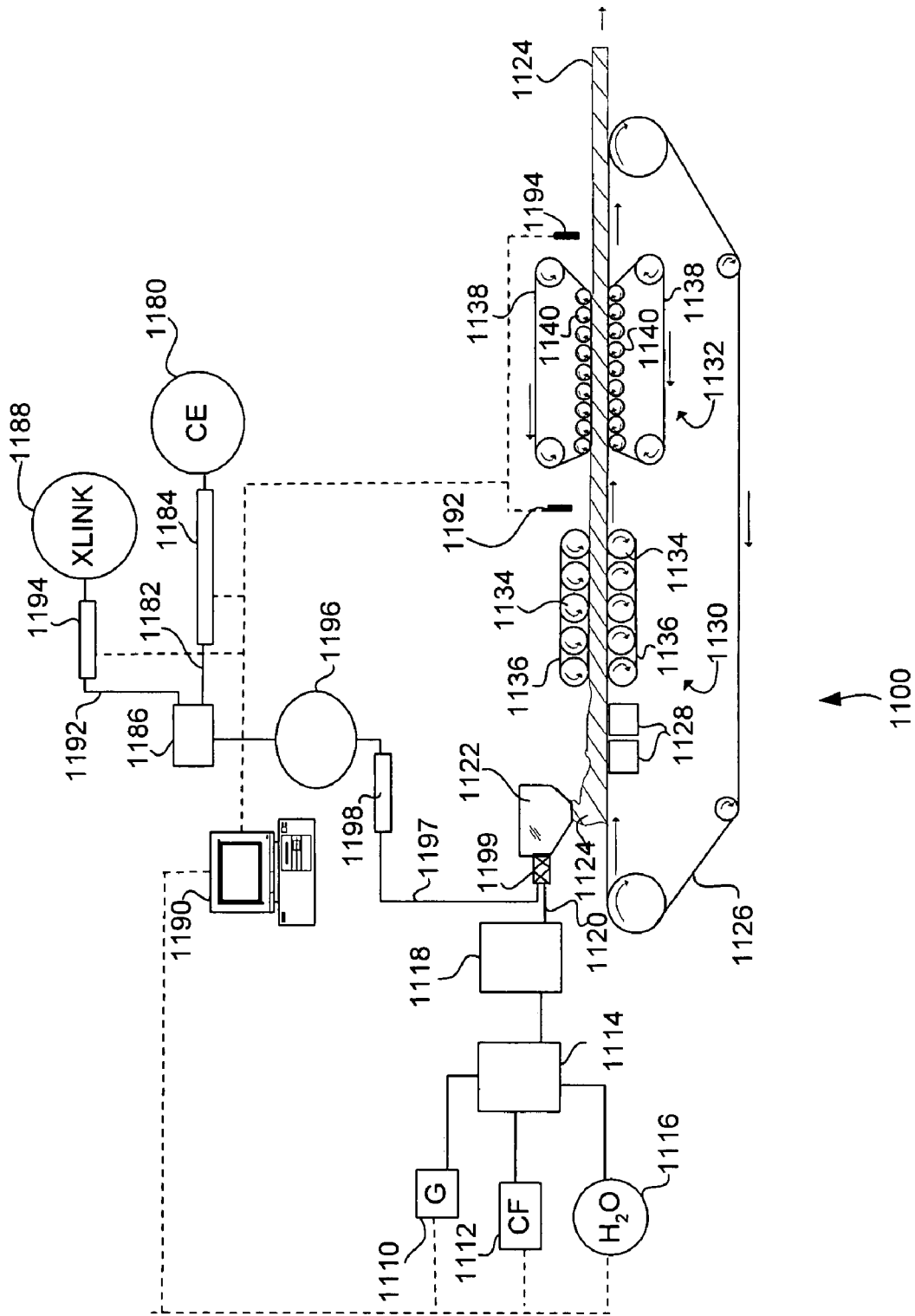
FIG. 11 is a schematic useful to illustrate additional methods and systems of the invention directed to use of cross-linkers with fiberboard applications; and, FIG. 12 is a schematic useful to illustrate additional methods and systems of the invention directed to delivering high temperature water together with cellulose ether in fiberboard applications.

System 1100 of FIG. 11 is similar in many respects to the systems 300 and 800 of FIGS. 4 and 9, respectively. For sake of clarity, similar element numbers in the 1100 series have been used in FIG. 11. No description of like elements is provided for sake of brevity, and description of these elements may instead be had through reference to the discussion of the system 300 made herein above.

Some aspects of the system 1100 are different, however, from the systems 300 and 800 and will be discussed. In particular, the system 1100 is configured to perform methods of introducing the cellulose ether to the gypsum slurry with a cross linker dry coated thereon. This is believed to achieve benefits and advantages as discussed above in relation to the system 800 of FIG. 9, with examples including delaying solubilization of the cellulose ether, maintaining a close physical proximity of the cellulose ether and the cross linker, and cost savings through use of a cross linker.

Cellulose ether is stored in a supply 1180. Any suitable cellulose ether may be used, including those discussed herein above such as methyl cellulose. The cellulose ether is a solid, and is conveyed along conduit 1182 by a transfer and metering device 1184 such as an auger, conveyor, scale or the like. The conduit 1182 communicates with a dry spray chamber 1186. Cross linker is stored in a supply 1188, and communicates with the dry spray chamber 1186 via conduit 1192 which may be a pipe or the like. The cross linker is contemplated as being a solid, although liquids may be used in some applications. A transfer and metering device 1194 such as an auger, conveyor or the like is provided to urge the cross linker through the conduit 1192 and to control the quantity delivered. Any of many suitable cross linkers may be used, including those disclosed above in connection with the systems 710, 800 and 910.

The dry spray chamber 1186 may be configured in any suitable manner as are known in the art for dry coating a solid particulate with a coating. By way of example, the dry spray chamber 1186 may be consistent with the dry spray chamber 1002 of FIG. 10. Through operation of the spray chamber 1186, a solid coating of cross linker is applied to the cellulose ether particulate, after which cellulose ether particles adhere to cross linker particles. In some (but not all) applications, the cellulose ether is substantially encapsulated by the cross linker. Dry coating may include steps of, for example, electrostatically charging one or both of the cellulose ether and cross linker such that they are attracted and will adhere to one another. The spray coated cross linker is transferred through a conduit, via a conveyor or the like to a storage container 1196. It will be appreciated that in some systems and methods of the invention the steps of dry coating the material may be carried out in a batch process as necessary to maintain the quantity stored in the container 1196 as desired. It has been illustrated as being carried out proximate and in line with the storage container 1196 for convenience.

The cellulose ether with its cross linker coating is transferred from the storage container 1196 to the headbox 1122 for mixing with the slurry via conduit 1197, with a solids transfer and metering device 1198 provided for driving delivery. The coated cellulose ether is added to the slurry at the entrance to the headbox 1122. In the system 1100, an eductor 1199 is provided for accomplishing this. Those knowledgeable in the art will appreciate that an eductor 1199 includes a straight liquid flow through a venture style system which results in a partial vacuum pulling on the solid coated cellulose ether supply conduit 1197 sufficient to draw the powder into the liquid stream. In other example systems and methods, a static mixer or other means may be provide for adding and mixing the solid coated cellulose ether into the slurry.

Example Embodiment

Cross Linker Emulsion (Fiberboard)

Figure 12:
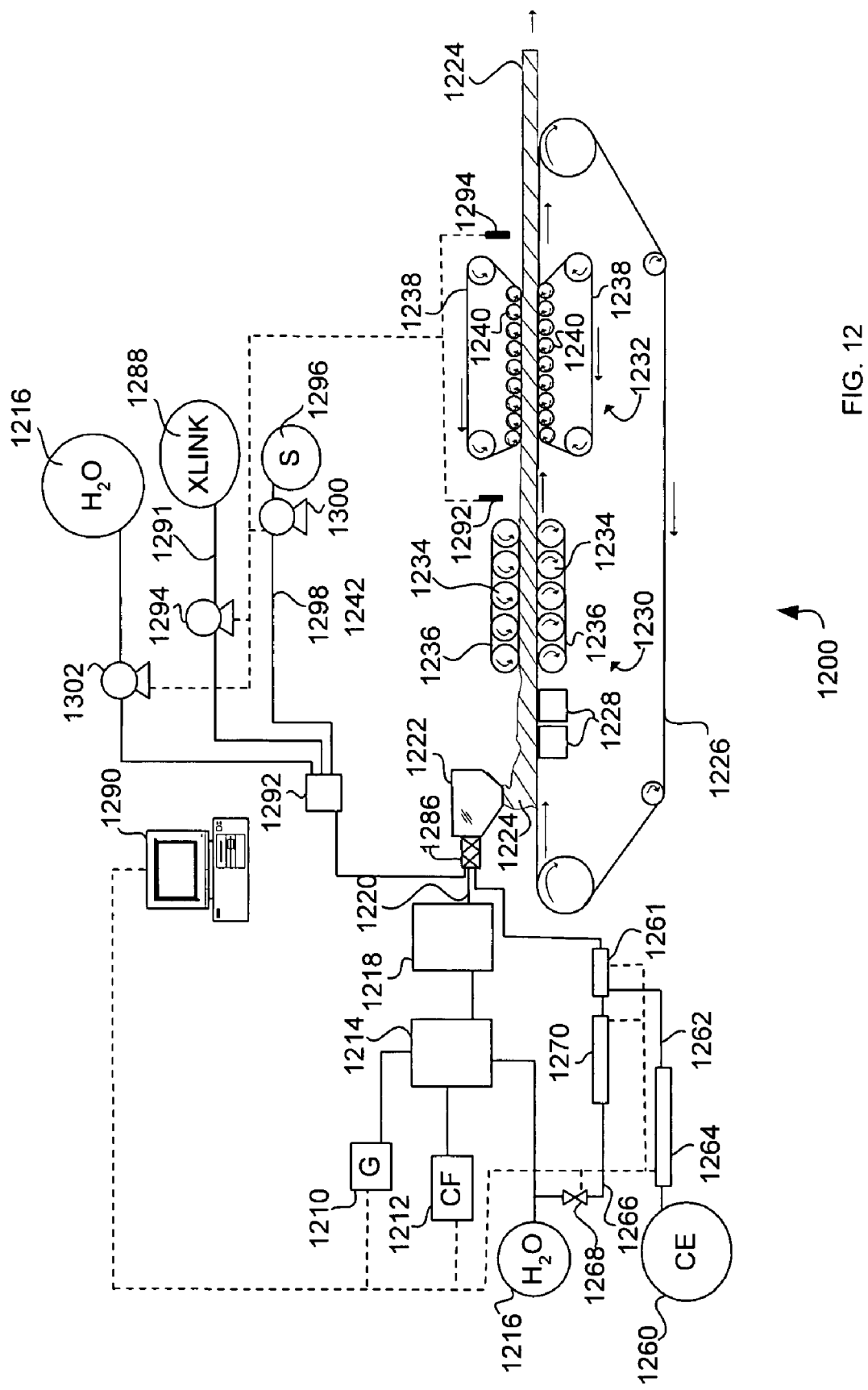

FIG. 12 is a schematic useful to illustrate still additional methods and systems of the invention. In particular, FIG. 12 is directed to use of a cross-linker in a fiberboard application, much like the systems 1100 and 800 and methods for using them that were discussed herein above. Unlike those systems, however, the cellulose ether in the system 1200 illustrated in FIG. 12 is delivered together with high temperature water to the slurry headbox.

The system 1200 of FIG. 12 shares many elements with the system 800 (as well as other fiberboard systems discussed herein). Like element numbers in the 1200 (and 1300-1302) series have been used for clarity. Description of these like elements is not necessary and is not provided for the sake of brevity. Description of these elements may be had by reference to the above discussion of those like elements in other systems and methods of the invention. For example, the cellulose ether supply 1260 (as well as the cellulose ether stored therein), surfactant supply 1296 (as well as surfactant stored therein), emulsion mixer 1292 are consistent with cellulose ether supply 896, surfactant supply 888, and emulsion mixer 892 of FIG. 9. Some elements of the system 1200, however, differ from those of other systems described herein and will be discussed herein below.

For example, the system 1200 and methods of using it introduce cellulose ether from the supply 1260 to the headbox 1222 together with water at a temperature selected to delay solubilization of the cellulose ether. In this manner, the system 1200 and methods of using it are similar to those of the system 410 and methods of using it (FIGS. 5A-B). As discussed with reference to those systems and methods, it is believed that one mechanism for accomplishing effective mixing of cellulose ether into a gypsum slurry is through exploitation of cellulose ether's low solubility in water at high temperatures. It is believed that just as the system 410 is useful to achieve this in a gypsum wallboard application, the system 1200 is useful for gypsum fiberboard applications. In particular, the example system 1200 is configured to combine the cellulose ether material with at least a portion of the water supplied to a container such as the headbox 1222 at a high temperature selected to prevent the cellulose ether from dissolving.

This high temperature water is believed to offer advantages and benefits, including effectiveness of transfer and mixing and delay of thickening effects. Because the cellulose ether is at least partially in solid form in the water stream as it is introduced to the slurry, thickening effects on the slurry are reduced or avoided. Only after the slurry 1224 cools to a temperature of about 150° F. (66° C.) or less will the cellulose ether begin to dissolve and then hydrate to form a gel. This may occur, for example, in the setting press 1232.

The system 1200 includes a cellulose ether supply 1260 communicating with a pre-mixer 1261 via supply conduit 1262. The conduit 1262 may be a conveyor, duct or the like in the case of solid cellulose ether material, or a pipe or the like in the case of liquid. A transfer device 1264 which may be an auger, conveyor, or other transfer device can be provided to urge the cellulose ether material from the supply 1260 to the pre-mixer 1261 (the auger or other transfer device may extend for substantially all of the distance between the supply 1260 and the pre-mixer 1261). A metering device such as a valve (not illustrated) or scale (not illustrated), which may be incorporated with the transfer device 1264, is provided to control the quantity of cellulose ether material supplied to the pre-mixer chamber 1261.

In the example system 1200 solid cellulose ether material is contemplated to be stored in the supply 1260. In other systems, however, a liquid supply may be used. In example systems that use liquid, the transfer device 1264 can be a pump, metering pump, valve, and other related elements suitable for carrying and metering liquids. Suitable devices such as metering pumps are well known in the art.

The cellulose ether material is combined prior to addition to the headbox 1222 with water supplied from the supply 1216. It is noted that both water supplies (one communicating with mixer 1214 and one with cross linker) in FIG. 12 have been identified as element 1216. This has been done to indicate that the supplies may be (but are not necessarily) common. In other example embodiments they may be separate. In the system 1200, the pre-mixer 1261 also communicates with a water bypass 1266. The bypass 1266 may be a pipe or the like. A bypass metering device 1268 is provided, with examples including valves (note that the valve 1268 illustrated might be located elsewhere along bypass 1266, and that additional valves might be provided to better restrict flow through the bypass 1266), metering pumps and the like, to control the quantity of water diverted through the bypass 1266.

The example system 1200 further includes a heat exchanger 1270 downstream from the bypass valve 1268 for heating the bypass water stream prior to combination with the cellulose ether. The heat exchanger 1270 can be configured to heat the bypass stream to a temperature suitably high to ensure that the cellulose ether remains in solid form and does not dissolve. This temperature will depend on the particular cellulose ether material being used.

In many applications, however, a temperature of at least about 150° F. (66° C.) is believed to be useful. In other example systems, steps of using a heat exchanger can be performed to heat the water to temperatures of at least about 160° F. (about 71° C.), at least about 180° F. (82° C.) or at least about 200° F. (about 93° C.). Particular temperature will vary with application parameters.

The ratio of the water provided through the bypass 1266 to the cellulose ether provided by the supply 1262 will also vary with application and design parameters. Generally, because one purpose of the bypass water stream is to disperse the solid cellulose ether in solid form, an excess of the bypass water supply may be provided. An excess of water also generally eases material transfer and mixing as compared to higher solids content streams. The excess should not be so great, however, that excessive drying energy will be required downstream to remove it.

Differing amounts of cellulose ether may likewise be useful depending on factors such as the particular cellulose ether used, slurry water content, additives present, properties of the gypsum present, the MW, chain length and DS of the cellulose ether, and the like. The weight ratio of the cellulose ether in the bypass water stream may be set as desired. In some gypsum fiberboard applications, a range of between about 5% to about 50% is believed to be useful, on a weight ratio of cellulose ether to water.

The cellulose ether and the heated bypass water stream are combined in the pre-mixer 1261. If the cellulose ether material stored in supply 1262 is in liquid form, the pre-mixer 1261 may include a static mixer. If the cellulose ether is in solid form, the pre-mixer 1261 may include an appropriate structure for mixing a solid and liquid, such as baffles or plates to encourage mixing. Agitation may also be provided, although sufficient fluid velocity may be sufficient to encourage efficient mixing without an agitator.

One suitable set of steps for mixing a solid cellulose ether material with the water from the bypass is through use of an eductor including a straight liquid flow through a venture style system which results in a partial vacuum pulling on the solid cellulose ether supply line 1262 sufficient to draw the powder into the high velocity liquid stream.

A second suitable set of steps is to use a small volume tank (not illustrated) with a top mounted agitator and bottom center outlet. The tank may have baffles and runs continuously with the liquid level above the level of the baffles. Above the baffles, a vortex is formed in the fluid which draws down the powder added to the surface. Once the vortex and powders reach the level of the top of the baffles, the vortex energy is dispersed into mixing energy which then mixes the powder with the liquid. Inputs to the mixing tank would include the hot water supply to a constant tank level and the cellulose ether powder which is metered from a weight loss feeder or other accurate device. A constant flow of liquid is pumped out of the tank and metering is accomplished by the rate of feed of the cellulose ether powder into the mixing tank.

Downstream of the pre-mixer 1261 the combined cellulose ether and water stream is a substantially homogeneous suspension. At least a portion of the cellulose ether material is suspended in solid form in the water downstream of the pre-mixer 1261. In some example systems, all of the substantially all of the cellulose ether is solid. The solid cellulose ether may be in the form of a fine, substantially evenly dispersed particulate in the stream downstream of the pre-mixer 1261.

This combined cellulose ether and heated water bypass stream is then introduced to the headbox 1222. In particular, it is introduced through the static mixer 1286 at the entrance to the headbox 1222. This is believed to result in effective mixing of the combined water and cellulose ether in the slurry. To ensure that all or at least a portion of the cellulose ether remains in solid form during transport to the headbox 1222, it may be desirable to heat, or at least insulate, the pre-mixer 1261 and/or the conduit or piping between the mixer 1261 and headbox 1222.

The controller 1290 is also linked at least to the cellulose ether material transfer and metering device 1264, to the bypass valve 1268, and to the heat exchanger 1270. As discussed above, the controller 1290 may be, for example, a computer such as a desktop or laptop PC, a server, a networked computer device, handheld processor based device, dedicated processor based controller, or other processor based device with a software program stored on its memory for operating the various devices it is linked to.

The controller 1290 can also be configured (through storage and execution of a computer program code, for example) to operate the bypass valve 1268 to control the flow rate of water through the bypass 1266, to operate the heat exchanger 1270 to control the bypass stream temperature, and the cellulose ether material supply transfer device 1264 to control the amount of cellulose ether combined with the bypass stream. The heat exchanger 1270 can include a sensor such as a thermocouple at its exit to provide temperature data to the controller 1290 for use in operation of the exchanger 1270.

An additional sensor such as a thermocouple (not illustrated) can be placed in, proximate to the exit of, or in a location downstream of the pre-mixer 1261 and linked to the controller 1290. The controller 1290 can use temperature data from such a sensor to tune the operation of the heat exchanger 1270, bypass valve 1268, and/or cellulose ether transfer device 1264. Manipulation of one or more of these devices can be performed to maintain a desired temperature of the combined water bypass and cellulose ether stream.

This configuration can be useful to ensure, for example, that the combined cellulose ether and water stream when delivered to the headbox 1222 is at least about 150° F. (66° C.), at least about 160° F. (71° C.), at least about 180° F. (82° C.), at least about 200° F. (93° C.), or some other desired minimum temperature. Such configuration thereby ensures that at least some, and in other instances substantially all, of the cellulose ether material is in solid form when delivered into the headbox 1222. This provides for easier dispersion and mixing in the slurry as compared to introducing a cellulose ether solid into the slurry, or as a gel or viscous solution.

Following delivery to the headbox 1222, the dispersed solid cellulose ether will remain in substantially solid form and will only solubilize after the slurry temperature has dropped to a temperature lower than about 150° F. (66° C.), which is expected in many applications to occur in the setting press 1232. In other applications it may occur, at least partially, in the drying press 1230.

It is believed that the system 1200 and methods of using it or similar systems achieve important benefits through using high temperature water to introduce the cellulose ether to the slurry as a solid, and maintaining it in solid form until the slurry has exited the headbox 1222. For example, thickening effects are delayed until the slurry is well mixed. Also, the cellulose ether in solid form is more likely to be well dispersed in the slurry that it would if it were in liquid form (and hence viscous). Also, initial mixing is believed to be more efficient when adding the cellulose ether carried in the water bypass stream as compared to adding solid cellulose to the slurry directly.

Multiple different system and method embodiments of the invention have been discussed and described herein to illustrate many different aspects of the present invention. It will be appreciated that the invention is not limited to these systems and methods, and that many others including equivalents and alternatives are likewise contemplated. Further, it will be appreciated that the present invention is not limited to the particular configuration of any system or method for using a system that have been described herein. Elements and steps of these systems and methods may be re-arranged, changed in sequence, and interchanged as desired. Parts of one particular system and steps for using the same may be used in other systems and methods. For example, steps of adding a cross-linker emulsion or cellulose ether dry coated with cross-linker as described in the systems and methods of FIGS. 8-11 may be useful in the systems and methods illustrated in FIGS. 2-7. Particular materials, concentrations and additives useful in one example system may be useful in others.

Further, it will be appreciated that many components and steps of different embodiments of methods and systems of the invention are consistent with one another. As noted herein above, description of some elements in some particular systems and methods has been avoided for sake of brevity, with description instead available through consideration of like elements of other systems and methods. Various process parameters have been discussed with respect to some but not all systems and methods described herein. By way of particular example, various additives and concentrations thereof useful in one system of the invention were described with reference to the system 10. It will be understood that these may likewise be useful with other systems and methods of the invention. This also applies to additives, temperatures, times and other process parameters that were described with regard to one or more systems and methods herein.

What is claimed is:

1. A method for preparing a gypsum slurry useful for making a gypsum board product comprising the steps of:
    obtaining calcined gypsum and water in the form of a slurry;
    preparing an emulsion of cellulose ether as a dispersed phase with at least a second material as a continuous phase, said emulsion being configured to delay solubilization of said cellulose ether; and
    adding said emulsion to said slurry, wherein said cellulose ether is solid and wherein said at least a second material comprises water at an elevated temperature selected to maintain said cellulose ether in solid form.

2. A method for preparing the gypsum slurry as defined by claim 1, wherein the obtaining step further comprises combining calcined gypsum and water to form a slurry in a mixer, and wherein the method further comprises the steps of:
    depositing said slurry on a moving receiver downstream from said mixer; and
    wherein said preparing step results in the emulsion whereby said cellulose ether is solubilized in said slurry only after said slurry has been deposited on said moving receiver.

3. A method for preparing the gypsum slurry as defined by claim 2 wherein the method is substantially continuous, and wherein the method further includes the steps of using at least one sensor to measure at least one physical property of said slurry at a location downstream from said mixer, and changing one or more of the quantity and quality of said emulsion being added to said slurry in response to a change in said slurry at least one physical property.

4. A method for preparing the gypsum slurry as defined by claim 1 wherein:
said cellulose ether comprises one or more of ethyl cellulose, propyl cellulose, hydroxypropyl cellulose, and methyl cellulose; and
said cellulose ether is provided in a weight ratio of between about 0.3 to 2 parts cellulose ether per about 99.7 to about 98 parts dry calcined gypsum.

5. A method for preparing the gypsum slurry as defined by claim 1 and further including the step of adding a foam to said slurry, and wherein the step of adding said emulsion to said slurry is performed after or simultaneous with the step of adding said foam to said slurry.

6. A method for making the gypsum slurry as defined by claim 1 wherein the method is further for making a gypsum board product, wherein the obtaining step further comprises combining water and said gypsum in a mixer, and wherein the method further comprises the steps of:
depositing said slurry on a moving receiver downstream from said mixer; and
wherein said emulsion releases said dispersed phase cellulose ether into said slurry after said slurry has been deposited on said moving receiver.

7. A method for making the gypsum slurry as defined by claim 1 wherein said emulsion comprises an inverted emulsion, wherein the method is further for making a gypsum board product, wherein the obtaining step further comprises combining water and said calcined gypsum in a mixer, and wherein the method further comprises the steps of:
depositing said slurry on a moving receiver; and
removing excess water from said slurry after depositing said slurry on said moving receiver resulting in a change in the surface tension of said slurry, and wherein said inverted emulsion reverses phases whereby said dispersed phase cellulose ether is released into said slurry as a result of said change in said surface tension.

8. A method for making the gypsum slurry as defined by claim 7 wherein the step of removing excess water comprises removing excess water through one or more of drying said slurry or allowing said calcined gypsum to absorb said excess water.

9. A method for preparing a a fiberboard product, comprising:
mixing gypsum dihydrate with water to form a slurry;
adding a cellulosic fiber to said slurry;
heating said slurry under pressure to convert said gypsum dihydrate to a hemihydrate;
preparing an emulsion of cellulose ether as a dispersed phase with at least a second material as a continuous phase, said emulsion being configured to delay solubilization of said cellulose ether;
transferring said slurry to a headbox; and transferring said slurry from said headbox to one or more presses; and,
adding said emulsion to said slurry at said headbox;
and wherein said emulsion releases said dispersed phase cellulose ether into said slurry after said slurry has been transferred to said one or more presses.

10. A method for making the gypsum fiberboard product as defined by claim 9 wherein said emulsion comprises an inverted emulsion, and further comprising the steps of:
reducing the excess water content of said slurry while said slurry is in said one or more presses wherein the surface tension of said slurry changes; and,
wherein said inverted emulsion reverses phases when said surface tension sufficiently changes in said one or more presses.

11. A method for preparing the slurry as defined by claim 9 wherein said one or more presses comprise a drying press followed by a setting press, and wherein said emulsion releases said dispersed phase cellulose ether primarily in said setting press.

12. A method for preparing the slurry as defined by claim 1 wherein the board product is a wallboard and wherein the method is further for making the wallboard product, wherein the obtaining step comprises mixing gypsum hemihydrate with water in a mixer, wherein the step of adding said emulsion to said slurry is performed in said mixer, and further including the steps of:
transferring said slurry from said mixer onto a first continuous sheet of wallboard facing material being carried on a conveyor;
depositing a second continuous sheet of wallboard facing material on said deposited slurry to define the wallboard;
drying said wallboard in at least one of a kiln or oven, and, configuring said emulsion to release said cellulose ether into said slurry while said wallboard is dried in said at least one of a kiln or oven.

13. A method for preparing the gypsum slurry as defined by claim 1 wherein the method is further for making a gypsum board product, wherein the obtaining step further comprises combining said gypsum with said cellulose ether in a mixer, the method further comprising the step of depositing said slurry on a moving receiver downstream from said mixer, wherein said slurry in said mixer is at a first temperature, and wherein said elevated temperature is greater than said first temperature and is selected to substantially prevent said cellulose ether from solubilizing in said slurry until said slurry has been deposited on said moving receiver.

14. A method for preparing the gypsum slurry as defined by claim 1 wherein the method is continuous, wherein the obtaining step is performed using a first water supply, wherein the step of combining said cellulose ether with said at least a second material is performed using a second water supply configured to provide said water at a temperature of at least about 150° F. (66° C.).

15. A method for preparing the gypsum slurry as defined by claim 14 wherein said second supply comprises a bypass from said first supply, wherein said temperature is at least about 160° F. (71° C.), and further comprising using a heat exchanger to heat said second water supply passing through said bypass to said second water supply temperature.

16. A method for preparing the gypsum slurry as defined by claim 1 wherein the method is carried out continuously, wherein the obtaining step is performed in a mixer and wherein said water is introduced into said mixer through use of a plurality of nozzles, wherein said emulsion is introduced into said mixer using no more than about half of said plurality of nozzles, and wherein said water is heated to a temperature of at least about 160° F. (71° C.) prior to combining with said cellulose ether.

17. A method for preparing the gypsum slurry as defined by claim 1 wherein said cellulose ether material is a solid, and wherein said elevated temperature is at least about 180° F. (82° C.), and wherein said obtaining step is performed using an eductor communicating with said mixer.

18. A method for preparing a gypsum slurry, comprising:
obtaining calcined gypsum and water in the form of a slurry;
preparing an emulsion of cellulose ether as a dispersed phase with at least a second material as a continuous phase, said emulsion being configured to delay solubilization of said cellulose ether;

adding said emulsion to said slurry; and adding a cross linker to said slurry, wherein said cross linker comprises said at least a second material, wherein said methyl cellulose and said cross linker are solids, and wherein the step of combining said cellulose ether with said at least a second material comprises causing said particles of solid cellulose ether to adhere to particles of said cross linker.

19. A method for preparing the gypsum slurry as defined by claim 18 wherein said cellulose ether comprises a powder and wherein the step of combining said methyl cellulose with said cross linker comprises spray coating said cellulose ether with said cross linker.

20. A method for preparing the gypsum slurry as defined by claim 18 wherein said cross linker solubilizes in said gypsum slurry earlier than said methyl cellulose.

21. A method for preparing the gypsum slurry as defined by claim 18 wherein said cross linker is provided in a weight ratio of between about 0.05-0.5% in said slurry.

22. A method for preparing the gypsum slurry as defined by claim 18 wherein the step of adding said cross linker comprises adding said cross linker as the dispersed phase in said emulsion, and further includes the step of depositing said slurry on a moving receiver, and wherein said emulsion is configured to release said cross linker into said slurry after said slurry has been deposited on said moving receiver.

* * * * *